(12) United States Patent
Hassan et al.

(10) Patent No.: US 7,910,758 B2
(45) Date of Patent: Mar. 22, 2011

(54) **CATALYTIC HYDROGENATION PROCESS FOR THE PRODUCTION OF LOW *TRANS* FAT-CONTAINING TRIGLYCERIDES**

(75) Inventors: Abbas Hassan, Sugarland, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation

( * ) Notice: Subject to any disclaimer, the term of this patent is extended or adjusted under 35 U.S.C. 154(b) by 580 days.

(21) Appl. No.: 11/961,788

(22) Filed: Dec. 20, 2007

(65) Prior Publication Data

US 2008/0161588 A1 Jul. 3, 2008

Related U.S. Application Data

(60) Provisional application No. 60/946,509, filed on Jun. 27, 2007, provisional application No. 60/883,104, filed on Jan. 2, 2007.

(51) Int. Cl.
*C11C 3/00* (2006.01)
(52) U.S. Cl. .................. 554/169; 554/161; 422/225
(58) Field of Classification Search .................. 554/161, 554/169; 502/34, 39; 422/255
See application file for complete search history.

(56) References Cited

U.S. PATENT DOCUMENTS

| 4,900,480 A | * | 2/1990 | Litz et al. | 261/36.1 |
| 4,973,430 A | * | 11/1990 | Rivers, Jr. | 554/144 |
| 2005/0027136 A1 | * | 2/2005 | Toor et al. | 554/141 |
| 2005/0033069 A1 | * | 2/2005 | Holl et al. | 554/141 |

FOREIGN PATENT DOCUMENTS

| WO | 2005012471 Y | | 2/2005 |
| WO | WO2005012471 | * | 2/2005 |

OTHER PUBLICATIONS

IKA. 2003 Process Catalog, IKAUS [online] 2003 [retrieved on Jun. 4, 2008] Retrieved from the Internet ,URL:http://ww.ikausa.com/pdfs/2003_Process_Catlog2.pdf. See p. 4 and 15.*

* cited by examiner

*Primary Examiner* — Deborah D Carr
(74) *Attorney, Agent, or Firm* — Timothy S. Westby; Porter Hedges LLP

(57) ABSTRACT

Hydrogenated vegetable oil exhibiting superior thermal stability and containing reduced levels of saturates and trans fatty acids are produced using an activated hydrogenation catalyst and/or an improved hydrogenation process incorporating high shear. The use of a high shear mechanical device incorporated into the hydrogenation process as a reactor device is shown to be capable of enabling reactions that would normally not be feasible under a given set of reaction pressure and temperature conditions. For example, the hydrogenation process described herein enables a reduction of hydrogenation time, and operation at lower temperatures than current processes. The resulting hydrogenated vegetable oil is particularly useful in frying, confectionery baking, and other applications where a product with a low trans fat content or higher thermal stability is desirable. The hydrogenated oil produced may comprise less than 10 weight % of trans fatty acids with less than 5 weight % of linolenic acid ($C_{18:3}$).

35 Claims, 4 Drawing Sheets

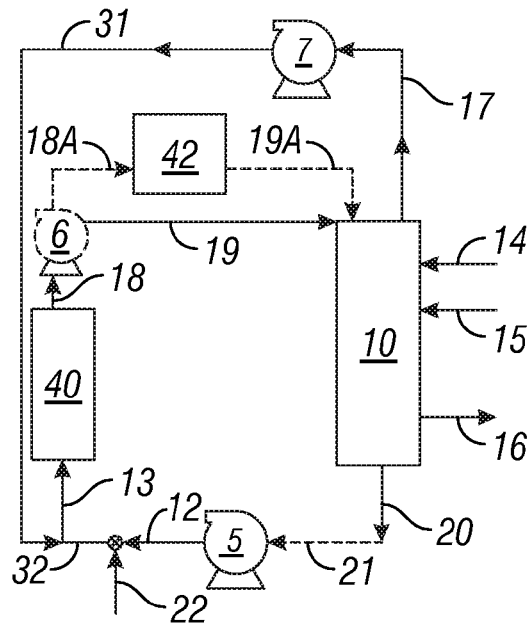
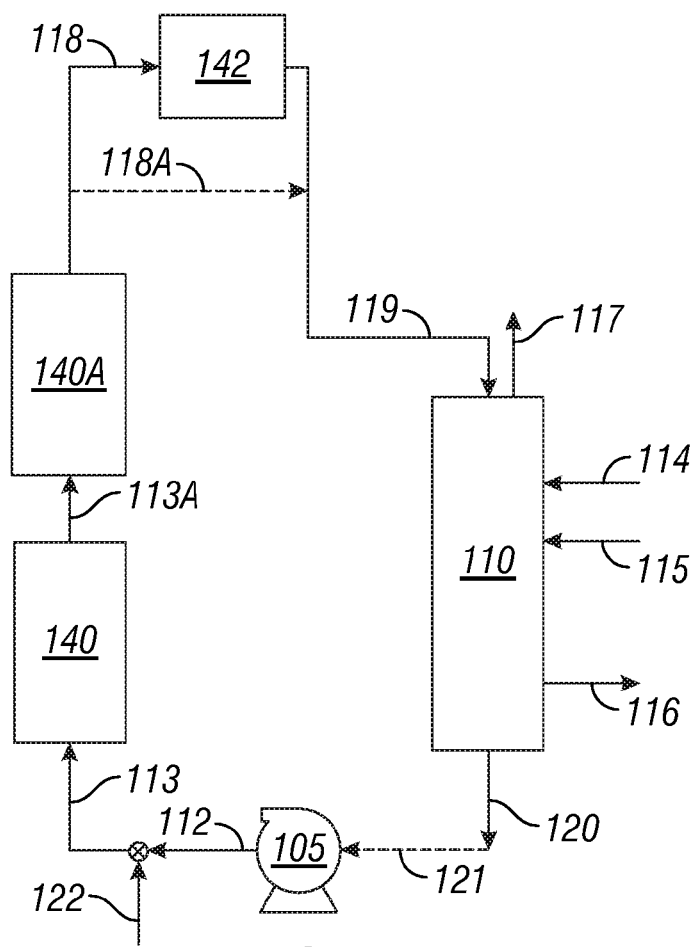
FIG. 3
FIG. 4

CATALYTIC HYDROGENATION PROCESS FOR THE PRODUCTION OF LOW *TRANS* FAT-CONTAINING TRIGLYCERIDES

CROSS-REFERENCE TO RELATED APPLICATIONS

This application claims the benefit of U.S. Provisional Patent Application Ser. No. 60/946,509, filed Jun. 27, 2007, and U.S. Provisional Patent Application Ser. No. 60/883,104, filed Jan. 2, 2007, which are hereby incorporated herein by reference in their entirety.

STATEMENT REGARDING FEDERALLY SPONSORED RESEARCH OR DEVELOPMENT

Not Applicable.

BACKGROUND OF THE INVENTION

1. Field of the Invention

This invention relates generally to the field of hydrogenation. More specifically, the invention relates to methods and catalyst for hydrogenation of unsaturated fatty acid compositions to yield triglyceride compositions having reduced levels of trans fats. More particularly, the present invention relates to a catalyst for the activation of fatty acids and a high shear process for improving the hydrogenation reaction. The disclosed process creates conditions of temperature, pressure and contact time such that hydrogenation may be accelerated beyond what is traditionally encountered in industry.

2. Background of the Invention

Chemical reactions involving liquids, gases and solids rely on the laws of kinetics that involve time, temperature, and pressure to define the rate of reactions. In cases where it is desirable to react two raw materials of different phases (i.e. solid and liquid; liquid and gas; solid, liquid and gas), one of the limiting factors in controlling the rate of reaction involves the contact time of the reactants. In the case of catalyzed reactions there is the additional rate limiting factor of having the reacted products removed from the surface of the catalyst to enable the catalyst to catalyze further reactants.

From a chemical perspective, fats are large molecules that support three fatty acid groups connected to a short backbone derived from glycerol, superficially resembling an E. What is commonly termed a trans fat is more accurately described as a fat that contains a trans fatty acid group. Fatty acid molecules consist of a backbone of carbon atoms, each with attached hydrogen atoms (as well as a carboxyl group positioned at the end of the molecule, which is not pertinent to this discussion). Fatty acids are characterized as saturated or unsaturated based on the number of double bonds in the acid. If the molecule contains the maximum possible number of hydrogen atoms then it is saturated; otherwise, it is unsaturated.

Carbon atoms are tetravalent, forming four covalent bonds with other atoms, while hydrogen atoms bond with only one other atom. In saturated fatty acids, each carbon atom is connected to its two neighboring carbon atoms as well as two hydrogen atoms. In unsaturated fatty acids the carbon atoms that are missing a hydrogen atom are joined by double bonds rather than single bonds so that each carbon atom participates in four bonds.

Hydrogenation of unsaturated carbon to carbon double bonds is commonly practiced in petroleum and chemical processing operations as well as in vegetable based oils processing. The main purpose of hydrogenation is to increase the stability of the oil and/or alter its physical properties. Although the focus of this invention is mainly on hydrogenation of fatty acids, the process can readily be applied to any unsaturated liquid hydrocarbon including petroleum products.

Hydrogenation of an unsaturated fatty acid refers to the addition of hydrogen atoms to the acid, converting double bonds to single bonds as carbon atoms acquire new hydrogen partners (to maintain four bonds per carbon atom). Full hydrogenation results in a molecule containing the maximum amount of hydrogen (in other words the conversion of an unsaturated fatty acid into a saturated one). Partial hydrogenation results in the addition of hydrogen atoms at some of the empty positions, with a corresponding reduction in the number of double bonds. Commercial hydrogenation is typically partial in order to increase stability and/or to obtain a malleable fat that is solid at room temperature, but melts upon baking (or consumption).

Oils extracted from vegetable seeds, and from produce such as soy, corn, rapeseed and the like consist primarily of triglycerides, a glycerin molecule combined with three fatty acid molecules. Vegetable oils derived from different sources differ from each other in the fatty acid component of the triglycerides. Fatty acids vary in both the length of carbon chain, and the number of double bonds present in those carbon chains. The majority of fatty acids in vegetable oils have carbon chain lengths varying from about $C_8$ to about $C_{20}$.

Hydrogenated vegetable oils are generally produced by contacting hydrogen gas with vegetable oil in the presence of a catalyst. Hydrogenation is used, for example, to increase the chemical stability of triglycerides comprising the oil, and/or to increase the triglyceride content that is solid at room temperature, as the hydrogen reacts with carbon-carbon double bonds of the fatty acid moieties of the triglycerides.

Triglyceride-based vegetable fats and oils can be transformed through partial or complete hydrogenation into fats and oils of higher melting point. The hydrogenation process typically involves "sparging" the oil at high temperature and pressure with hydrogen in the presence of a catalyst, typically a powdered nickel compound. As each double-bond in the triglyceride is broken, two hydrogen atoms form single bonds. The elimination of double-bonds by adding hydrogen atoms is called saturation; as the degree of saturation increases, the oil progresses towards being fully hydrogenated. An oil may be hydrogenated to increase resistance to rancidity (oxidation) or to change its physical characteristics. As the degree of saturation increases, the viscosity and physical state of the oil may be changed (liquid to solid).

The use of hydrogenated oils in foods has never been completely satisfactory. Because the center arm of the triglyceride is shielded somewhat by the end triglycerides, most of the hydrogenation occurs on the end triglycerides. This makes the resulting fat more brittle. A margarine made from naturally more saturated tropical oils will be more plastic (more "spreadable") than a margarine made from hydrogenated soy oil. In addition, partial hydrogenation can result in the formation of trans fats, which have, since about the 1970s, been increasingly viewed as unhealthy. In conventional hydrogenated vegetable oils, the hydrogenation process converts many of the double bonds from the cis position to the trans position. These trans fatty acids are undesirable for human consumption due to the association of trans fatty acids with adverse health effects, such as hypercholesterolemia.

Because of current health concerns about the levels of trans fats in foods, it is desirable to produce edible fats and oils that can be labeled as containing "zero trans fat". Current regulations issued by the U.S. Food and Drug Administration, effective Jan. 1, 2006 allow for products with trans fat levels of less than 0.5 grams per serving to be labeled as containing 'zero trans fat' (68 Federal Register 41434 (2003)). As used herein the term "low trans fat" will refer to levels of trans fat that would qualify products containing them to be labeled as "zero trans fat" in accordance with these regulations.

Low trans fat products (e.g., certain margarines and hydrogenated vegetable oils) are generally formed from a blend of inter-esterified fats, unsaturated vegetable oils, saturated vegetable oils and mixtures thereof. While these processes produce a low trans fat product, the product is often high in saturated fats. Saturated fats are also not desirable for human consumption due to adverse health effects. Other methods of reducing trans fat while trying to minimize the formation of saturated fat have been disclosed, but none have proven satisfactory. For example, one can lower the stearic acid ($C_{18:0}$) content of a hydrogenated oil by chilling the oil and solidifying the saturated fat, followed by physical separation, as known to those skilled in the art (Food Industries Manual, $24^{th}$ Edition, 1997, Christopher G J Baker; Published by Springer; pp. 289-291).

There are numerous patents concerning hydrogenation of triglyceride to control the levels of trans fat or the level of saturated fats.

U.S. Pat. No. 5,064,670 (Hirshorn et al.) describes a frying fat exhibiting a reduced concentration of saturates and a method of frying food products as well as frying confectionaries such as doughnuts. Such fat products are produced by blending various oils to the desired properties for frying or confectionary use.

U.S. Pat. No. 5,194,281 to Johnston et al. describes polyol fatty acid polyesters with reduced trans double bond levels and a process for making them.

United States Pat. App. Pub. No. 2005/0027136 A1 (Van Toor et al.) describes a process to hydrogenate vegetable oils with an activated catalyst. The process uses pressures ranging from about 7 to about 30 bar (from about 100 psi to over 400 psi), and reaction times ranging from 100 minutes ("min") to over 400 min. Van Toor et al. note that such long hydrogenation times (460 min) may prove unduly expensive for low cost frying oils, margarines, bakery fats or similar applications. Most commercial equipment used for hydrogenation utilizes pressures in the range of 60 psi, and with reaction times of 60 to 90 minutes. The Iodine Values of the hydrogenated oils produced in the examples are not provided, such that it is difficult to determine the extent of hydrogenation.

With rare exception, no reaction below 480° C. occurs between $H_2$ and organic compounds in the absence of metal catalysts. The catalyst simultaneously binds both the $H_2$ and the unsaturated substrate and facilitates their union. Platinum group metals, particularly platinum, palladium, rhodium and ruthenium, are highly active catalysts. Highly active catalysts operate at lower temperatures and lower pressures of $H_2$. Non-precious metal catalysts, especially those based on nickel (such as Raney nickel and Urushibara nickel) have also been developed as economical alternatives but they are often slower and/or require higher temperatures. The trade-off is activity (speed of reaction) vs. cost of the catalyst and cost of the apparatus required for use of high pressures.

Two broad families of catalysts are known; homogeneous catalysts and heterogeneous catalysts. Homogeneous catalysts dissolve in the solvent that contains the unsaturated substrate. Heterogeneous catalysts are solids that are suspended in the same solvent with the substrate or are treated with gaseous substrate. In the pharmaceutical industry and for special chemical applications, soluble "homogeneous" catalyst are sometimes employed, such as the rhodium-based compound known as Wilkinson's catalyst, or the iridium-based Crabtree's catalyst.

The activity and selectivity of catalysts can be adjusted by changing the environment around the metal, i.e. the coordination sphere. Different faces of a crystalline heterogeneous catalyst display distinct activities, for example. Similarly, heterogeneous catalysts are affected by their supports, i.e. the material upon with the heterogeneous catalyst is bound. Homogeneous catalysts are affected by their ligands. In many cases, highly empirical modifications involve selective "poisons." Thus, a carefully chosen catalyst can be used to hydrogenate some functional groups without affecting others, such as the hydrogenation of alkenes without touching aromatic rings, or the selective hydrogenation of alkynes to alkenes using Lindlar's catalyst. For prochiral substrates, the selectivity of the catalyst can be adjusted such that one enantiomeric product is produced.

Unsaturated triglycerides are refractory towards hydrogenation and typically require high temperature, high pressure, protracted hydrogenation time or combinations thereof in order to obtain satisfactory hydrogenation. Conventionally, unsaturated triglycerides are hydrogenated with hydrogen gas in the presence of at least 0.2 to 0.5% nickel hydrogenation catalyst and occasionally more at temperatures around or above 150° C. under pressures of from 60 psig to 100 psig and higher. Times of at least 1 to 8 hours or more are required depending on the degree of hydrogenation desired. By contrast, hydrogenation of glyceride oils (which generally are not refractory towards hydrogenation) typically can be accomplished in relatively short times at about 100° C.-260° C. at pressures of around 0 psig to 100 psig. Fatty acids, then, are adjudged to be refractory towards hydrogenation by comparison and contrast to glyceride oils. Hydrogenation of fatty acids and glyceride oils is outlined in Bailey's Industrial Oil and Fatty Products, $3^{rd}$ Edition, pp. 719-896 (Interscience Publishers, New York, N.Y., 1964), the same being expressly incorporated herein by reference. A continuous process for the hydrogenation of fatty acids is also described in U.S. Pat. Nos. 5,382,717 and 4,847,016, which are hereby incorporated herein for all purposes.

As can be seen in the discussion above, technology involving the hydrogenation of fatty acids has focused on improving the catalysts required for hydrogenation. To this point, methods of improving mass transfer of hydrogen into unsaturated fatty acids or lowering the temperature of the hydrogenation reaction have not heretofore been addressed.

Numerous devices have been proposed for accelerating the rates of reaction for reactions other than the hydrogenation of fatty acids. For example, there has been disclosure by Shah et al. (*Cavitation Reaction Engineering*, ISBN 06461412) of a method of accelerating chemical reactions through the use of hydrodynamic cavitation. Hydrodynamic cavitation occurs when the pressure variation caused by the variation in the flowing liquid velocity results in a phase change and rapid increases in temperatures and pressures that result in accelerated chemical reaction.

In conventional reactors, contact time for the reactants and or catalyst is often controlled by mixing which provides contact with two or more reactants involved in a chemical reaction. There have been various innovations directed towards maximizing the use of mixing and mixing devices to accelerate chemical reactions.

High shear and high energy mixers are well known devices that have been reported for use in some chemical reactions. For example, U.S. Pat. No. 7,138,434 (Huff et al.) describes a process for converting synthesis gas to higher hydrocarbons by introducing a synthesis gas feed stream into a continuous stirred reactor system comprising a reactor vessel containing a suspension of a solid particulate Fischer-Tropsch catalyst suspended in a liquid medium.

U.S. Pat. No. 6,822,007 (Ketley et al.) describes a process for converting synthesis gas into higher hydrocarbons utilizing a high shear mixing zone and a tubular loop reactor where the high shear mixing zone is an injector-mixing nozzle.

U.S. Pat. No. 6,502,980 (Ekstrom et al.) discloses the use of in-line homogenizer using rotors and stators in a housing for creating emulsions, suspensions and blends used in pharmaceutical, biological, cosmetic, chemical and food compositions.

United States Patent Application No. 20050130838 (Duan, Xue, et al.) discloses the use of a colloid mill reactor to produce a nano-scale magnetic solid base catalyst.

U.S. Pat. No. 5,369,167 (Pottick, et al.) describes a process for melt blending acid or anhydride-grafted block copolymer pellets with epoxy resin. The epoxy resin-modified block copolymer blend is held under high shear mixing under conditions sufficient to react an amount of the modified hydrogenated block copolymer functional groups with epoxy groups effective to provide a stable dispersion of the modified hydrogenated block copolymer in the epoxy resin.

The term 'high-shear mixer' has been used to describe non mechanical mixers. U.S. Pat. No. 6,235,961 (Kurukchi) describes a process for pretreating cracked gas before a caustic tower treatment in ethylene plants which effectively increases the efficiency and capacity of the caustic tower by using a high-shear mixer, such as an inline, cocurrent-flow static mixer or a venturi scrubber with a caustic solution and the cracked gas.

In recognition of the need to provide contact between reactants in chemical reactions, prior art often includes terms such as 'mixing', 'high shear mixing,' 'rapid mixing' and the like when describing conditions under which a reaction occurs. These un-quantified parameters often used for mixing efficiency provide little insight into the degree of efficiency to which they are contributing to the overall rate of reaction of the reactants involved.

There is still a need in industry for improved processes and catalysts for hydrogenating fatty acid compositions. The improved catalyst and/or process should reduce or eliminate problems associated with the prior art catalysts and processes. These problems include, but are not limited to, production of products having either an off taste or flavor and/or an unsuitable mouth feel; extended reaction times for hydrogenation that reduce plant throughput; use of expensive catalysts (as is the case with platinum-based catalysts); use of excessive reaction pressures and/or temperatures; production of resulting fatty acids that do not posses the required stability to be used in commercial frying applications; and/or the inability to achieve levels of trans fat and saturated fat that are acceptable to consumers and health experts. Such an improved process for hydrogenation may accelerate the rate of the hydrogenation reaction, for example, by improving the gaseous dissolution of hydrogen in the liquid phase and/or the activity of the catalyst.

SUMMARY OF THE INVENTION

Method and systems for the hydrogenation of a fatty acid composition, and catalysts therefore, are described herein. An object of the present invention is to provide a stable hydrogenated vegetable oil with low trans fat and saturated fat content that is suitable for a broad range of products including, but not limited, to pourable vegetable oils, frying oil, peanut butter stabilizers, cosmetics, confections, frostings, baked goods, prepared cake mixes and margarine as well as industrial applications including paper coatings, and as a substitute for petroleum based waxes.

Another object of the present invention is to provide such a hydrogenated vegetable oil exhibiting superior product appearance, texture, and stability, and to provide a method for its preparation. Herein disclosed is a method for the preparation of a hydrogenated vegetable oil exhibiting superior product appearance, texture and stability. Embodiments of the present invention include a hydrogenated vegetable oil that has a reduced level of trans fatty acids as well as having a low content of saturated fats.

Another aspect of the present invention involves contacting hydrogen and oil in a high shear device to increase surface area and contact of the hydrogen, catalyst and oil. Without wishing to be limited by theory, the high shear device may also cause localized conditions of pressure and temperature that promote hydrogenation. High shear is utilized to promote the dispersing and solubility of the hydrogen in the triglyceride phase. This novel process either used alone or in combination with other aspects of the present invention allows for hydrogenation at lower temperature and/or pressure conditions than conventional, while still maintaining reaction times that are consistent with conventional reaction times. Alternatively, the hydrogenation may be performed in decreased reaction times at conventional temperatures and/or pressures.

Herein disclosed is a hydrogenation system comprising: at least one high shear device comprising: an inlet for a mixture comprising hydrogen gas and unsaturated liquid fat or oil or comprising at least one inlet for a stream comprising unsaturated liquid fat or oil and at least one inlet for a gas stream comprising hydrogen; and comprising an outlet for a dispersion comprising hydrogen gas bubbles having an average bubble size of less than about 5 µm. In embodiments, the average bubble size is less than about 0.4 µm.

The high shear device may comprise at least one revolving element that creates the mechanical force applied to the reactants. The high shear device may comprise at least one stator and at least one rotor separated by a clearance. In some embodiments, the minimum clearance between the stator and the rotor is in the range of from about 0.001 inch to about 0.125 inch. In certain embodiments, the minimum clearance between the stator and rotor is about 0.060 inch. The high shear device may produce a tip speed of at least 1000 ft/min. The high shear device may comprise a colloid mill. In embodiments, the colloid mill is a multiple stage inline disperser. The shear force produced by the high shear device may vary with longitudinal position along the flow pathway.

In some embodiments, the system further comprises a vessel downstream of the at least one high shear device, wherein an inlet of said vessel is fluidly connected with the dispersion outlet of the high shear device. The vessel may further comprise an outlet for a recycle stream, the outlet for the recycle stream being fluidly connected with the inlet for a stream comprising unsaturated liquid fats or being fluidly connected with the mixture inlet of the at least one high shear device.

The system may further comprise a pump configured to increase the pressure of the recycle stream prior to introduction of the recycle stream into the at least one high shear device.

In some embodiments, the high shear system comprises at least two high shear devices. The at least two high shear devices may, in some embodiments, be connected in series.

Also disclosed herein is a method of hydrogenating fats, the method comprising: subjecting hydrogen and triglycerides and/or unsaturated fatty acids to high shear in at least one high shear device, wherein the at least one high shear device comprises: an inlet for a mixture comprising hydrogen gas and triglycerides and/or unsaturated fatty acids or comprising at least one inlet for a stream comprising unsaturated triglycerides and/or unsaturated fatty acids and at least one inlet for a gas stream comprising hydrogen; and comprising an outlet for a dispersion; and forming a dispersion in the high shear device whereby hydrogen reacts with unsaturated fats to saturate at least a portion of the unsaturated fats, whereby the dispersion comprises hydrogen bubbles having an average bubble size of less than about 5 μm. In embodiments, the bubble diameter is less than about 0.4 μm.

The method may further comprise contacting the dispersion with a hydrogenation catalyst. The catalyst may comprise iron, ruthenium, osmium, cobalt, rhodium, iridium, nickel, palladium and platinum or combinations thereof. In embodiments, hydrogen reacts with unsaturated fats to saturate at least a portion of the unsaturated fats at a reaction temperature of less than about 100° C. In some embodiments, hydrogen reacts with unsaturated fats to saturate at least a portion of the unsaturated fats at a reaction temperature of less than about 70° C. In some embodiments, hydrogen reacts with unsaturated fats to saturate at least a portion of the unsaturated fats at a reaction temperature of less than about 35° C.

In some embodiments of the disclosed method, contacting the dispersion with a hydrogenation catalyst to form at least a partially hydrogenated product comprises introducing the dispersion to a fixed bed reactor containing the catalyst.

The stream comprising triglycerides and/or unsaturated fatty acids may further comprise hydrogenation catalyst.

The hydrogenation method may further comprise mixing the catalyst with the stream comprising triglycerides and/or unsaturated fatty acids to form a slurry prior to introducing the hydrogen gas into the stream comprising triglycerides or unsaturated fatty acids. Mixing the catalyst with the stream comprising triglycerides and/or unsaturated fatty acids to form a slurry may comprise contacting the catalyst and liquid stream in a reactor, wherein the reactor comprises: a recycle outlet fluidly connected to the inlet for a stream comprising triglycerides and/or unsaturated fatty acids or connected to the mixture inlet of the at least one high shear device; an outlet for gas; and an inlet for dispersion; and wherein the method further comprises introducing slurry from the reactor to the at least one high shear device via the recycle outlet, and introducing dispersion from the at least one high shear device into the reactor via the inlet for dispersion. The reactor may be at atmospheric pressure.

Hydrogen may be continuously injected into the slurry exiting the reactor and the slurry circulated throughout the system until a desired saturation has been attained.

In embodiments, the unsaturated fatty acids are selected from the group consisting of myristoleic acid, palmitoleic acid, oleic acid, linoleic acid, alpha-linolenic acid, arachidonic acid, eicosapentaenoic acid, erucic acid, docosahexaenoic acid, and combinations thereof.

In embodiments, the triglyceride stream is selected from the group consisting of vegetable oil, rapeseed oil, animal fats, corn oil, canola oil, olive oil, cottonseed oil, safflower oil, palm oil, soya oil, sunflower oil, peanut oil, coconut oil, and combinations thereof.

In embodiments, the iodine value of the triglycerides and/or unsaturated fatty acids is decreased by at least 10%.

Another novel aspect of the present invention includes the use of an inert gas or organic solvent in the hydrogenation process that allows for hydrogenation without high conversion of unsaturated fatty acids from the cis to the trans position and for controlled levels of saturation during the hydrogenation process. The addition of an inert gas such as nitrogen and/or injection of an organic solvent may modify the reaction rates of the hydrogenation process. Without wishing to be limited by theory, it is theorized that an inert gas, or an organic solvent, may provide for more uniform thermal and physical contact among the catalyst, hydrogen and the oil.

Thus, the stream comprising triglycerides and/or unsaturated fatty acids may further comprise an organic solvent. In embodiments, the organic solvent comprises hexane.

The catalyst used in the previously described method may be activated by heating an activation vessel comprising the catalyst and introducing an activation gas to the catalyst at a pressure greater than atmospheric pressure. The activation gas may further comprise a gas selected from the groups consisting of hydrogen, $CO_2$, He, nitrogen, and combinations thereof. Activating the catalyst may further comprise purging gas from the activation vessel during activation.

Also disclosed are methods of activating commercially available hydrogenation catalysts such that the resulting catalyst is more active in the hydrogenation of unsaturated fatty acids. The use of this activated catalyst enables the exposure of more active sites than initially available in the non-activated commercial catalyst and a reduction in the presence of oxides and other impurities in the hydrogenated oil. In embodiments, hydrogen gas is utilized to activate the catalyst.

The method of activating a hydrogenation catalyst comprises: heating the catalyst in an activation vessel; introducing an activation gas to increase the vessel pressure to an elevated pressure greater than atmospheric pressure; and maintaining the vessel at the elevated pressure for an activation duration; wherein the vessel is purged of gas during the activation. In embodiments, the activation gas comprises at least one selected from the group consisting of hydrogen, nitrogen, helium, carbon monoxide, and combinations thereof.

Also disclosed herein is a method of reducing trans fats produced during hydrogenation of unsaturated fats which incorporates the disclosed use of high shear, catalyst activation, and use of organic solvent. This method comprises: contacting unsaturated fats and an organic solvent with hydrogen in the presence of a hydrogenation catalyst; wherein the hydrogenation catalyst is activated by injecting an activation gas into a vessel comprising the catalyst prior to hydrogenation to increase the pressure of the vessel to greater than atmospheric pressure, and wherein the vessel is purged during activation. The activation gas may comprise at least one selected from the group consisting of nitrogen, helium, carbon dioxide, and combinations thereof. The organic solvent may comprise hexane.

The foregoing has outlined rather broadly the features and technical advantages of the present invention in order that the detailed description of the invention that follows may be better understood. These and additional features and advantages that form the subject of the claims of the invention will become apparent from the following detailed description. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiment of the present invention, reference will now be made to the accompanying drawings, wherein:

FIG. 3 is a flow diagram illustrating an enhancement to a high shear hydrogenation system where by gas collected at the outlet of the high shear unit is re-introduced into the suction end of the high shear device.

FIG. 4 illustrates a general flow diagram of another embodiment of a high shear hydrogenation system according to this disclosure, this embodiment comprising two high shear devices.

NOTATION AND NOMENCLATURE

Figure 1:
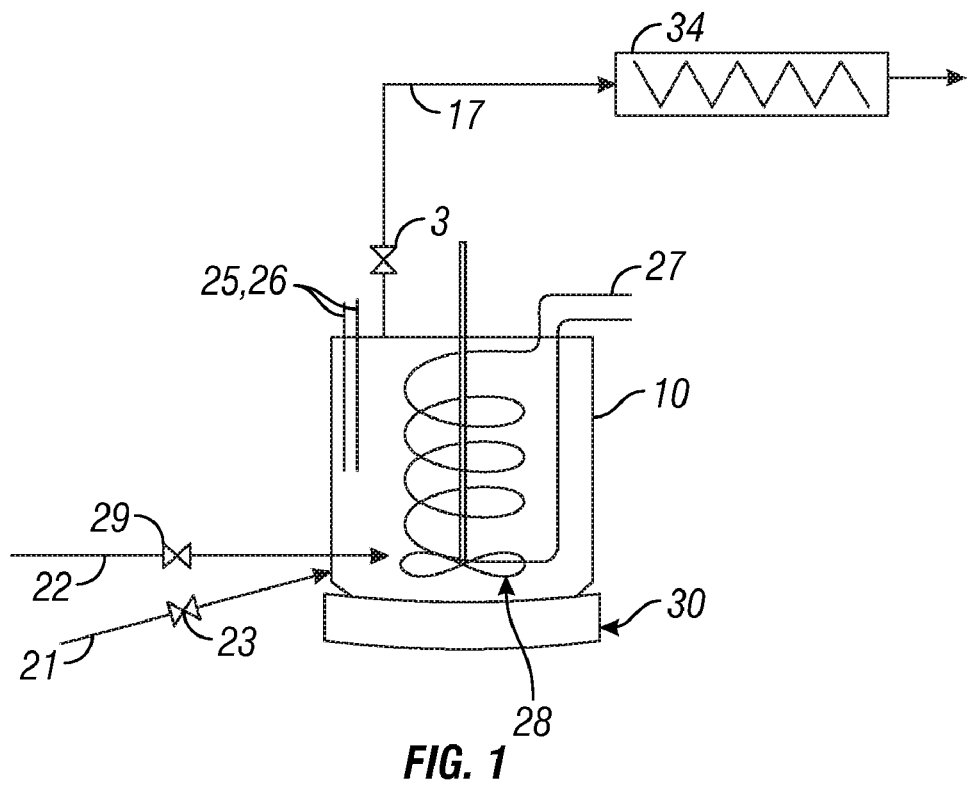
FIG. 1 is a schematic of a conventional configuration of a hydrogenation reactor with agitator and heating mantle. This prior art configuration may be used with inventive activated catalyst, inert gas injection, and/or organic solvent according to embodiments of this invention.

Certain terms are used throughout the following description and claims to refer to particular system components. This document does not intend to distinguish between components that differ in name but not function.

As used herein, "multi-phase" refers to reaction involving reactions with two or more different phases.

The term "fat" as used herein is intended to include all triglycerides regardless of origin or whether they are solid or liquid at room temperature. The term "fat" includes, but is not limited to, normally liquid and normally solid vegetable and animal fats and oils. The term "oil" as employed herein, is intended to refer to those fats that are liquid in their non-activated state as well as to products comprising unsaturated carbon to carbon double bonds such as, but not limited to, crude oil. Such oils are obtained from petroleum and chemical processing operations as well as in vegetable based oils processing. Natural and synthetic fats and oils are included in these terms, although the focus of this specification will be on those fats that are edible. Included within this group are fatty acids, which, for example, include long carbon chains, typically of lengths such as from $C_6$ to $C_{20}$.

The term "edible oil" or "base oil" as used herein refers to oil which is substantially liquid at room temperature and has an iodine value of greater than 70, more preferably greater than 90. The base oil can be an unhydrogenated oil or a partially hydrogenated oil, a modified oil or a mixture thereof.

The term "saturates", "saturated fat", and "saturated fatty acids" as used herein refer to $C_4$ to $C_{26}$ fatty acids or esters containing no unsaturation, unless otherwise indicated. In the examples contained herein the fatty acid composition of the triglycerides was obtained using AOCS Official Method Ce 2-66 (American Oil Chemists' Society (("AOCS")), 2211 W. Bradley Ave., Champaign, Ill.).

The term "trans", "trans fatty acids", "trans isomers" and "trans isomers of fatty acids" as used herein refer to fatty acids and/or esters containing double bonds in the trans configuration, generally resulting from the hydrogenation or partial hydrogenation of a fat. In the examples contained herein, the measurement of trans and cis isomers was performed in accordance with test methods as described in AOCS Official Method Ce 1c-89.

The term "iodine value" or "IV" as used herein refers to the number of grams of iodine equivalent to halogen adsorbed by a 100 gram sample of fat. The IV is a measure of the unsaturated linkages in a fat. For the examples contained herein the iodine value was determined by the AOCS Recommended Practice Cd 1c-85.

As used herein, 'tip speed' refers to the velocity (ft/min or m/sec) associated with the end of the one or more revolving element that creates the mechanical force applied to the reactants.

As used herein, "high shear" refers to rotor stator devices that are capable of tip speeds in excess of 1000 ft/min.

The term "normal" applies to gaseous material at a temperature of 20° C. and a pressure of 1 atmosphere.

In the following discussion and in the claims, the terms "including" and "comprising" are used in an open-ended fashion, and thus should be interpreted to mean "including, but not limited to . . . ".

All percentages recited herein are by weight unless otherwise specified.

DETAILED DESCRIPTION OF THE PREFERRED EMBODIMENTS

Overview

Herein disclosed are a hydrogenation system and process comprising utilization of at least one external high shear mechanical device to provide rapid contact and mixing of chemical ingredients in a controlled environment in the high shear device. The high shear device reduces the mass transfer limitations on the reaction and thus increases the overall hydrogenation rate. The high shear device may also create localized conditions of pressure and temperature that promote hydrogenation.

Also disclosed herein are methods of activating hydrogenation catalyst such that the hydrogenation is improved. The catalyst activated according to this disclosure may be utilized in conventional hydrogenation processes, or as part of the high shear hydrogenation process described herein.

Also disclosed herein are methods of hydrogenation comprising inert gas injection and/or organic solvent utilization to enhance the hydrogenation, in some aspects by improving levels of trans fat in the partially hydrogenated product.

In conventional reactors, contact time for the reactants and/or catalyst is often controlled by mixing which provides contact with two or more reactants involved in a chemical reaction. Embodiments of the disclosed method comprise an external high shear device to decrease mass transfer limitations and thereby more closely approach kinetic limitations.

When reaction rates are accelerated, residence times may be decreased, thereby increasing obtainable throughput. Alternatively, where the current yield is acceptable, decreasing the required residence time allows for the use of lower temperatures and/or pressures than conventional hydrogenation processes. Furthermore, in homogeneous hydrogenation reactions (i.e. with no solid catalyst), the disclosed process may provide for more uniform temperature distribution within the reactor enhancing hydrogenation.

The present inventors have unexpectedly discovered that high shear reactors can in fact promote hydrogenation reactions under time and pressure conditions previously unobtainable, as further discussed hereinbelow.

I. System

A. Description of Conventional Hydrogenation System

FIG. 1 is a schematic of conventional hydrogenation system 100. System 100 comprises reactor 10 with associated internal paddle agitator 28, cooling coil 27, and heating mantle 30. Reactor 10 also comprises gas injection valve 29, pressure relief valve 3, discharge valve 23, temperature probe 25 and pressure gauge 26. Heating mantle 30 is capable of heating reactor 10.

In embodiments, reactor 10 is selected from commercially-manufactured reactors. Although the Examples hereinbelow describe reactors ranging from 500 mL capacity to 10 liters capacity, other sizes can be utilized according to this disclosure.

According to various embodiments of this disclosure, an activated hydrogenation catalyst, inert gas injection, and/or organic solvent addition may be utilized in a conventional hydrogenation system as shown in FIG. 1, or in the high shear hydrogenation system, a description of which follows.

B. Description of High Shear Hydrogenation System

Figure 2:
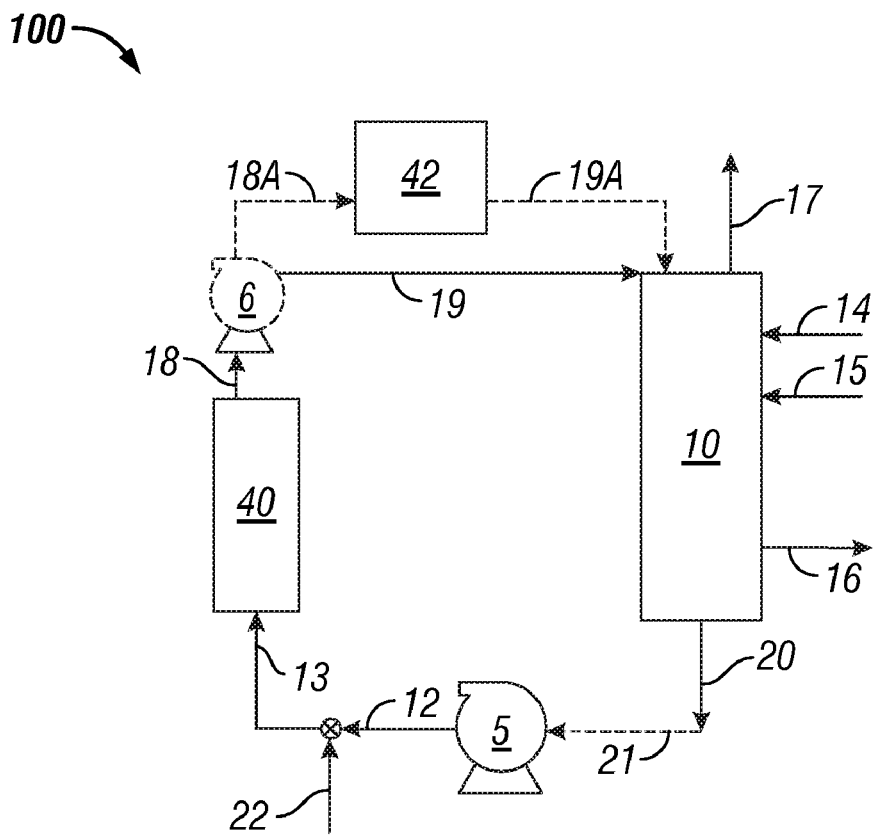
FIG. 2 is a general flow diagram of an embodiment of a high shear hydrogenation system comprising a high shear device.

FIG. 2 is a process flow diagram of a representative high shear hydrogenation system 100 for the production of hydrogenated fatty acid compositions. The basic components of the system comprise an external high shear device 40, reactor 10, and pump 5. The use of dashed lines in FIG. 2 indicates that additional steps (not shown) may be incorporated between reactor 10, external high shear device 40, and pump 5 in some applications of the process and some components. For example, pump 6 may be optional in certain embodiments.

Gas Feed Stream

Dispersible gas stream 22 comprises hydrogen to be dispersed in liquid solution 12 in high shear device 40. Liquid solution 12 may comprise an oil to be hydrogenated. In embodiments, dispersible gas stream 22 is continuously fed into liquid solution 12 to form high shear device feed stream 13. In embodiments, the feed rate of dispersible gas stream 22 is greater than about 50 cc/min. Alternatively, the feed rate of dispersible gas stream 22 is greater than about 80 cc/min. Alternatively, the feed rate of dispersible gas stream 22 is from about 3 SCFH to about 5 SCFH.

Liquid Solution

In embodiments, liquid solution 12 comprises an unsaturated base oil to be hydrogenated. The base oil may comprise unsaturated triglycerides, fatty acids and fatty acid derivatives of natural or synthetic origin. Petroleum oils that have some degree of unsaturation may also be hydrogenated with the disclosed process. Examples of fatty acids include without limitation, myristoleic acid, palmitoleic acid, oleic acid, linoleic acid, alpha-linolenic acid, arachidonic acid, eicosapentaenoic acid, erucic acid, docosahexaenoic acid, or combinations thereof. The sources of fatty acids are generally substrates of natural origin. Suitable substrates of natural origin include without limitation, vegetable oil, rapeseed oil, animal fats, corn oil, canola oil, olive oil, cottonseed oil, safflower oil, palm oil, soya oil, sunflower oil, peanut oil, coconut oil, or other oils and triglycerides of natural origin, as well as fatty acids and/or fatty acid derivatives obtained therefrom by lipolysis, such as, for example, $C_8$-$C_{22}$ fatty acids. Table 1 lists the chemical name, carbon chain length, and number of double bonds of some common fatty acids.

TABLE 1

| Fatty Acid Composition and Nomenclature | |
|---|---|
| C8 | Octanoic acid |
| C10 | Capric acid |
| C12 | Lauric acid |
| C14 | Myristic acid |
| C15 | Pentadecanoic acid |
| C15:1 | Pentadecanoic acid |
| C16 | Palmitic acid |

TABLE 1-continued

| Fatty Acid Composition and Nomenclature | |
|---|---|
| C16:1 | Palmitoleic acid |
| C17 | Heptadecanoic acid |
| C17:1 | 10-Heptadecanoic acid |
| C18 | Stearic acid |
| C18:1 | Oleic acid |
| C18:2 | Linoleic acid |
| C18:3 | Linolenic acid |
| C20 | Arachidic acid |
| C20:1 | Eicosenoic acid |
| C22 | Behenic acid |
| C22:1 | Erucic acid |
| C24 | Liqnoceric acid |

In the course of the hydrogenation, the double bonds in the alkyl groups of these fatty acids or triglycerides may be substantially completely hydrogenated so that hardening is obtained, or, if desired, may be partially hydrogenated to obtain a product which is less than fully hardened.

In embodiments, the starting triglyceride oil or fat (hereinafter referred to as either as "base oil", or "feedstock") has an IV ranging from about 70 to greater than about 130, and it may be either a liquid or a solid at room temperature. The base oil may be bleached and/or deodorized, and generally contains trace amounts of free fatty acids. The source of the oil and/or the method used to make the base oil are not important, so long as the base oil is an unhydrogenated or partially hydrogenated oil.

Oils suitable for the purpose of this invention can be derived from, for example, the naturally occurring liquid oils such as sunflower oil, canola oil, soybean oil, olive oil, corn oil, peanut oil, safflower oil, high oleic sunflower oil, and glycerol esters of purified fatty acid methyl esters, polyglycerol esters. Suitable liquid oil fractions can be obtained from palm oil, lard, and tallow, for example, by fractionation or by direct interesterification, followed by separation of the oil.

Liquid solution 12 may further comprise an organic solvent, as discussed further in Example 5 hereinbelow. An example of a suitable organic solvent is hexane; other suitable solvents are those that have a low boiling point and which either evaporate easily or can be removed by distillation, thereby leaving the dissolved substance (the fatty acids) behind. The organic solvents should not react chemically with the compounds dissolved therein.

While some of the base oils have a tendency to oxidize, some contain a natural antioxidant, and others are naturally stable to oxidation. It is not necessary to add an antioxidant to the naturally stable oils, but to those which tend to oxidize, the level of antioxidant to be added depends on several factors, including the end use application of the oil, and the length of time, temperature, oxygen presence and partial pressure to which the oil will be exposed. In embodiments, an antioxidant is added at levels that typically range from about 0.1% to about 0.5% by weight.

A wide variety of antioxidants are suitable for use, including but not limited to tocopherol, butylated hydroxytoluene ("BHT"), butylated hydroxyanisole ("BHA"), tertiary butylhydroquinone ("TBHQ"), ethylenediaminetetracetic acid ("EDTA"), gallate esters (e.g. propyl gallate, butyl gallate, octyl gallate, dodecyl gallate, and the like), tocopherols, citric acid, citric acid esters (e.g. isopropyl citrate and the like), gum guaiac, nordihydroguaiaretic acid ("NDGA"), thiodipropionic acid, ascorbic acid, ascorbic acid esters (e.g. ascorbyl palmitate, ascorbyl oleate, ascorbyl stearate and the like), tartaric acid, lecithin, methyl silicone, polymeric antioxidant (Anoxomer), plant (or spice and herb) extracts (e.g. rosemary, sage, oregano, thyme, marjoram and the like) and mixtures thereof. In embodiments, ascorbyl palmitate in combination with tocopherol is used as the antioxidant. In embodiments, an antioxidant is added to the hydrogenated oil to increase the stability thereof.

High Shear Device

High shear hydrogenation system 100 comprises at least one high shear device 40. High shear device 40 serves to create a fine dispersion of hydrogen gas 22 in liquid solution 12 and also create localized pressure and temperature conditions that promote hydrogenation. In high shear device 40, hydrogen gas and base oil are highly dispersed such that nanobubbles and microbubbles of the hydrogen are formed for superior dissolution into the base oil solution.

As used herein, a high shear device 40 is any high shear device capable of dispersing, or transporting, one phase or ingredient (e.g. liquid, solid, gas) into a main continuous phase (e.g. liquid), with which it would normally be immiscible. Preferably, the high shear device may use an external mechanically driven power device to drive energy into the stream of products to be reacted. The process of the present disclosure comprises utilization of a high shear mechanical device to provide rapid contact and mixing of chemical ingredients in a controlled environment in the reactor/mixer device. High shear mechanical devices include homogenizers as well as colloid mills as discussed further hereinbelow.

External high shear device 40 is a mechanical device that utilizes, for example, a stator rotor mixing head with a fixed gap between the stator and rotor. Dispersible gas stream 22 and liquid solution 12 are introduced separately or as mixed high shear device inlet stream 13 into the inlet of external high shear device 40. The high shear mixing results in the dispersing of hydrogen in micron- or submicron-sized bubbles. Therefore, high shear device outlet dispersion stream 18 comprises a dispersion of micron- and/or submicron-sized hydrogen bubbles which, in certain embodiments, is introduced into reactor 10 as reactor inlet stream 19, after undergoing, optionally, further processing as may be desired in a particular application prior to entering reactor 10. The streams 18, 19 and the contents of reactor 10 may be maintained at a specified temperature.

Preferably, high shear device 40 is enclosed, such that the pressure and temperature of the reaction mixture may be controlled. In embodiments, the use of a pressurized high shear device 40 enables the use of a reactor 10 which is not pressure controlled. As controlling the pressure of a larger volume of reactants is more capital intensive, the incorporation of high shear device 40 into high shear hydrogenation system 10 may reduce operating costs.

In embodiments, external high shear device 40 serves to intimately mix liquid solution 12 with gaseous dispersible reactant stream 22. In embodiments, the resultant dispersion comprises microbubbles. In embodiments, the resultant dispersion comprises bubbles in the submicron size, alternatively in the nanoparticle size. It is known in emulsion chemistry that sub-micron particles dispersed in a liquid undergo movement primarily through Brownian motion effects. Without being limited to a specific theory to explain certain features or benefits of the present methods, it is proposed that sub-micron gas particles created by high shear device 40 have greater mobility thereby facilitating and accelerating the gas/liquid (and/or gas/liquid/solid) phase reaction through greater interaction of reactants.

In embodiments, the bubble size in dispersion 18 is from about 0.4 to about 1.5 μm. In embodiments, the bubble size is from about 0.1 to about 1.5 μm. In embodiments, the resultant dispersion has an average bubble size less than about 1.5 μm.

In embodiments, the resultant dispersion has an average bubble size less than about 1 μm. In some preferred embodiments, the resultant dispersion has an average bubble size less than about 0.4 μm. In embodiments, the high shear mixing produces hydrobubbles capable of remaining dispersed at atmospheric pressure for about 15 minutes or longer depending on the bubble size. Example 9 hereinbelow provides a description of hydrogen bubbles produced via the high shear device according to an embodiment of this invention.

High shear mixing devices are generally divided into classes based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. There are three classes of industrial mixers having sufficient energy density to consistently produce mixtures or emulsions with particle sizes in the range of submicron to 50 microns.

Homogenization valve systems are typically classified as high energy devices. Fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the 0-1 micron range.

At the other end of the spectrum are high shear device systems classified as low energy devices. These systems usually have paddles or fluid rotors that turn at high speed in a reservoir of fluid to be processed, which in many of the more common applications is a food product. These systems are usually used when average particle sizes of greater than 20 microns are acceptable in the processed fluid.

Between low energy-high shear devices and homogenization valve systems, in terms of the mixing energy density delivered to the fluid, are colloid mills, which are classified as intermediate energy devices. The typical colloid mill configuration includes a conical or disk rotor that is separated from a complementary, liquid-cooled stator by a closely-controlled rotor-stator gap, which is commonly between 0.001-0.40 inches. Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing. An approximation of energy input into the fluid (kW/L/min) can be estimated by measuring the motor energy (kW) and fluid output (L/min).

Tip speed is the velocity (ft/min or m/sec) associated with the end of the one or more revolving element that is creating the mechanical force applied to the reactants. The high shear device should combine high tip speeds with a very small shear gap to produce significant friction on the material being processed. In embodiments, the high shear device produces a local pressure in the range of about 150,000 psi and elevated temperatures at the tip of the shear mixer. For colloid mills typical tip speeds are in excess of 4500 ft/min (23 m/sec) and can exceed 7900 ft/min (40 m/sec). For the purpose of the present disclosure the term 'high shear' refers to mechanical rotor stator devices (mills or mixers) that are capable of tip speeds in excess of 1000 ft/min. and require an external mechanically driven power device to drive energy into the stream of products to be reacted.

In some embodiments, external high shear device 40 comprises a high shear colloid mill wherein the stator and rotor are disposed such that the minimum clearance between the stator and rotor is maintained at between about 0.001 inch and about 0.125 inch. In alternative embodiments, the process comprises utilization of a high shear colloid mill wherein the stator and rotor of the colloidal high shear device are disposed such that the minimum clearance between the stator and rotor is maintained at about 0.060 inch. In some embodiments, the rotor is set to rotate at a speed commensurate with the diameter of the rotor and the desired tip speed. In some embodiments, the colloidal mill has a fixed clearance between the stator and rotor. Alternatively, the colloid mill has adjustable clearance.

In some embodiments, external high shear device 40 comprises a high shear mill. In some embodiments, external high shear device 40 comprises a colloid mill. Suitable colloidal mills are manufactured by IKA® Works, Inc. Wilmington, N.C. and APV North America, Inc. Wilmington, Mass., for example. In some embodiments in which a solid catalyst is sent through external high shear device 40, selection of the appropriate mixing tools may allow for catalyst size reduction/increase in catalyst surface area.

In certain specific embodiments, external high shear device 40 comprises a Dispax Reactor® of IKA® Works, Inc. Wilmington, N.C. and APV North America, Inc. Wilmington, Mass. Several models are available having various inlet/outlet connections, horsepower, nominal tip speeds, output rpm, and nominal flow rate. Selection of high shear device 40 will depend on throughput requirements and desired bubble size in the outlet dispersion 18 from the external high shear device 40.

In some embodiments, transport resistance is reduced by incorporation of external high shear device 40 such that the velocity of the reaction is increased by greater than a factor of about 5. Alternatively, by a factor of greater than about 10. In some embodiments, transport resistance is reduced by incorporation of external high shear device 40 such that the velocity of the reaction is increased by a factor of from about 5 to about 100 times.

In some embodiments, high shear device 40 comprises a single stage dispersing chamber. In some embodiments, high shear device 40 comprises a multiple stage inline disperser. In preferred embodiments, high shear device 40 is a multistage mixer whereby the shear force varies with longitudinal position along the flow pathway, as further described hereinbelow.

In embodiments, high shear device 40 comprises two stages. In some embodiments, high shear device 40 comprises three stages. In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size. In some embodiments, each of three stages is operated with super-fine generator.

Disperser IKA model DR 2000/4 is a high shear, three stage dispersing device. Three rotors in combination with a stator are aligned in series to create the dispersion of hydrogen in liquid medium comprising base oil. Mixed high shear device inlet stream 13 enters the high shear device at a high shear device inlet and enters a first stage rotor/stator combination having circumferentially spaced first stage shear openings. The coarse dispersion exiting the first stage enters the second rotor/stator stage, having second stage shear openings. The reduced bubble-size dispersion emerging from the second stage enters the third stage rotor/stator combination having third stage shear openings. The dispersion exits the high shear device via a high shear outlet as high shear device dispersion outlet stream 18. In embodiments, the shear force increases stepwise longitudinally along the direction of the flow. For example, in embodiments, the shear force in the first rotor/stator stage is greater than the shear force in subsequent stages. In other embodiments, the shear force is substantially constant along the direction of the flow, with the stage or stages being the same.

IKA model DR 2000/4, for example, comprises a belt drive, 4M generator, PTFE sealing ring, inlet flange 1" sanitary clamp, outlet flange ¾" sanitary clamp, 2 HP power, output speed of 7900 rpm, flow capacity (water) approximately 300-700 L/h (depending on generator), a tip speed of from 9.4-41 m/s (~1850 ft/min to 8070 ft/min). The rotor and stator of IKA model DR 2000/4 are cone shaped, and have comprise three stages of increasingly fine serrations, or grooves. The stator can be adjusted to obtain the desired gap between the rotor and the stator. The grooves change directions in each stage for increased turbulence.

External high shear device 40 may comprise a PTFE seal which may be cooled by using techniques that are known to those of skill in the art. Liquid reactant, for example liquid solution 12, may be used to cool the seal and thus be preheated as desired.

In embodiments, high shear device delivers a certain amount of energy per volume/weight of fluid. In embodiments, the high shear device delivers at least 300 L/h with a power consumption of 1.5 kW at a nominal tip speed of at least 4500 fpm.

Once dispersed, the dispersion exits high shear device 40 as high shear device outlet dispersion stream 18, which may enter reactor 10 as reactor inlet dispersion stream 19. High shear device outlet dispersion stream 18 may undergo processing, such as heating, cooling, or pumping prior to introduction into reactor 10 as reactor inlet dispersion stream 19. As further discussed hereinbelow, in certain embodiments, much of the hydrogenation occurs between pump 5 and high shear device outlet 18, and no discrete reactor 10 is incorporated into high shear system 100.

Reaction rates can be further accelerated through a system configuration as shown in FIG. 3 where un-reacted hydrogen gas 17 is separated in reactor 10 and recycled back to the inlet 32 of the high shear unit by means of a pump 7. In this way a greater volume of hydrogen gas can be passed through the high shear unit without venting of excess hydrogen.

Reactor 10

Hydrogenation of the fatty acids in base oil 12 will occur whenever suitable time temperature and pressure conditions exist, in the presence of catalyst. Therefore, conversion may occur at any point in the flow diagram of FIG. 2 where temperature and pressure conditions are suitable. A discrete reactor 10 is desirable in some applications, however, to allow for increased residence time, agitation and heating and/or cooling. It has been discovered that hydrogenation can occur primarily between pump 5 and the outlet of the high shear device 18, and in embodiments, no discrete 'reactor' 10 is required.

In embodiments comprising vessel/'reactor' 10, reactor 10 may be any type of reactor in which a multiphase reaction may continue. For instance, a continuous or semi-continuous stirred tank reactor, or a batch reactor may be employed in series or in parallel. In some embodiments, reactor 10 is a tower reactor. In some embodiments, reactor 10 is a tubular reactor. In embodiments, reactor 10 is a multi-tubular reactor. The temperature in reactor 10 may be controlled using any method known to one skilled in the art. As much of the conversion may occur within high shear device 40, reactor 10 may serve primarily as a storage vessel in certain embodiments.

Reactor 10 may comprise fatty acid liquid feed inlet 14, inert gas injection 15 and product removal stream 16. In embodiments, inert gas 15 is injected into reactor 10 (or elsewhere within high shear hydrogenation system 100) to enhance the hydrogenation and reduce the production of trans fats, as further discussed in Examples 2 and 3 hereinbelow.

Reactor 10 may further comprise temperature control (i.e., heat exchanger), stirring system, and level regulator, employing techniques that are known to those of skill in the art.

In embodiments, reactor 10 (or 110 in FIG. 4) may be selected from any number of commercially-manufactured reactors and may be of any suitable capacity. Lab scale reactor 10 capacity may be, for example, from 500 mL to 10 L. Commercial size reactors can be sized to 40,000 L and larger.

Pump

In FIG. 1, external high shear device 40 is positioned between pump 5 and reactor 10. Pump 5 is used to provide a controlled flow throughout high shear device 40 and high shear hydrogenation system 100. Pump 5 builds pressure and feeds external high shear device 40. In embodiments, pump 5 increases the pressure of the fatty acid stream 21 entering pump 5 to greater than 2 atm. In some applications, pressures greater than about 20 atmospheres may be used to accelerate hydrogenation, with the limiting factor being the pressure limitations of the selected pump 5 and high shear device 40.

Where food grade requirements need to be met, preferably, all contact parts of pump 5 are stainless steel, for example, 316 stainless steel. Pump 5 may be any suitable pump, for example, a Roper Type 1 gear pump, Roper Pump Company (Commerce Ga.) or a Dayton Pressure Booster Pump Model 2P372E, Dayton Electric Co (Niles, Ill.).

As shown in FIG. 2, high shear hydrogenation system 100 may comprise pump 6 positioned after high shear device 40. In this embodiment, high shear hydrogenation system 100 comprises high pressure pump 6 for boosting the pressure into reactor 10 to accelerate the reaction still further. When pump 6 is incorporated as a booster pump, pump 5 may be used as a throttling pump/valve to reduce pressure to the high shear unit 40, thus reducing wear thereof.

Catalyst for Hydrogenation of Fatty Acids

In embodiments, hydrogenation system 100 comprises a hydrogenation catalyst. Any catalyst known to those experienced in the art may also be utilized for hydrogenation. In embodiments, a catalyst may be employed to enhance the hydrogenation of fatty acids. For hydrogenation of unsaturated fatty acids, suitable catalysts may be any of the catalysts normally used for hydrogenation of unsaturated fats or fatty acids. These catalysts generally comprise one or more transition metals or compounds of one or more transition metals in a form suitable for hydrogenation. Catalysts comprising one or more metals from group VIII or VIIIA of the periodic system of elements and/or one or more of their compounds are preferably used for the process according to the invention. Such catalysts include, but are not limited to, copper-based and platinum-based hydrogenation catalysts. The metals iron, ruthenium, osmium, cobalt, rhodium, iridium, nickel, palladium and platinum and compounds thereof have proved to be particularly successful. For economic reasons, and also by virtue of its particular efficiency, catalysts comprising nickel or one or more of its compounds may be particularly useful for use as catalyst for the hydrogenation of fats, fatty acids and/or fatty acid derivatives in accordance with the present invention.

In embodiments, the catalyst employed is a transition-metal catalyst fixed to an insoluble support. The insoluble support may be the type commonly employed in the catalytic hydrogenation of fats and fatty acids. In some preferred embodiments, the catalyst is employed as a suspension in a small portion of the reaction product.

A suitable hydrogenation catalyst is, for example, NYSOFACT®120 from Engelhard Corporation, Erie, Pa. (a BASF company). NYSOFACT® 120 is a nickel silicate catalyst, with approximately 22% by weight Ni content. The catalyst may be supplied as solid 'droplets' coated with a protective hydrogenated vegetable oil that has been hydrogenated to a point where the material is solid at room temperature. This hydrogenated oil coating serves as a protective barrier to reduce reaction of the catalyst with oxygen in the air. The protective barrier is removed in order to expose the active sites of the catalyst. Removal of the protective barrier may be effected by heating the catalyst. In embodiments, removal of the protective barrier is effected by heating the protected catalyst to a temperature in the range of from about 80° C. to about 85° C.

Embodiments of the present invention utilize a commercially available nickel based catalyst as a starting material. Other commercially available nickel based catalysts such as a nickel-rhenium catalyst (described in U.S. Pat. No. 4,111, 840, which is hereby incorporated herein by reference in its entirety) can also be utilized in the present invention.

Nickel catalysts are usually protected from exposure to air following their manufacture, because exposure to any oxidizing environment will cause oxidation of some or all of the active catalyst sites, thereby rendering the catalyst less active in its ability to hydrogenate the C=C double bonds. It has been discovered that residual oxides may remain in the nickel-based catalyst, even following storage using the best practices recommended by the catalyst's manufacturer.

Prior art references utilize hydrogen as a pre-treatment to provide a more active nickel catalyst, but the Van Toor et al. reference recognizes that certain reaction pressures and reaction times are above those presently used commercially.

Figure 5:
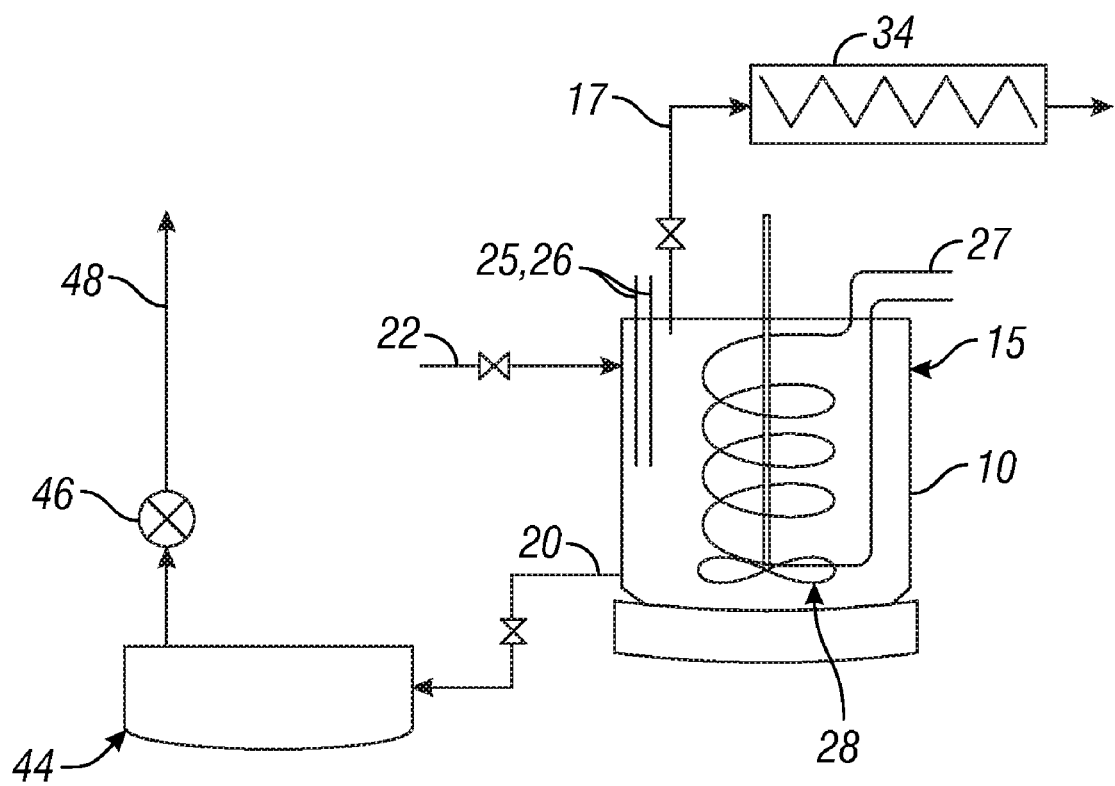
FIG. 5 is a schematic illustration of the reactor used in an embodiment of this disclosure to produce activated hydrogenation catalyst.

According to an embodiment of the present invention treats the commercially available nickel catalyst such that the resulting activated catalyst has greater activity. FIG. 5 is a schematic of a system for activating a catalyst according to this disclosure. The catalyst is activated by introducing an amount of catalyst in a reactor 10 with agitator 28 and heating mantle. The heating mantle is utilized to heat the catalyst to a temperature at which any protective coating melts. In the case of NYSOFACT®120 this temperature may be about 80° C. Once the wax coating has melted the reactor 10 is sealed and hydrogen flow is started, for example, via hydrogen injection 16. A second gas inlet valve 15 is used to allow other nonoxidizing gasses, such as nitrogen or hydrogen, for example, to be used in this step where the main purpose is to inhibit oxidation of the catalyst.

Reactor agitator 28 is used to stir the reactor contents during activation. Other suitable mixing devices may be used as known to those of skill in the art. In embodiments, reactor agitator 28 is operated at about 1000 rpm during activation.

In embodiments, hydrogen gas at a temperature of 150° C., and flow rate of 3-5 SCFH (standard cubic feet per hour) at 20 psi is continuously added into reactor 10 for a period of 2 hours. Excess hydrogen and other volatiles are removed from reactor 10 during activation through vent 17. Bleeding reactor 10 may also allow for removal of water that is formed as the hydrogen reacts with the catalyst during activation.

Following catalyst activation, reactor 10 is allowed to air cool while maintaining hydrogen pressure in the reactor. In embodiments, reactor 10 is allowed to air cool to 100° C. while maintaining hydrogen pressure of 20 psi in reactor 10. In alternative embodiments, some cooling may be provided. The activated catalyst may then be transferred into a sealed drying dish 44. Sealed drying dish 44 may be flushed with nitrogen. The activated catalyst is maintained under vacuum (via vacuum pump 46) to avoid contact of the activated catalyst with any source of oxygen or moisture that can deactivate the catalyst.

The activated catalyst may be sized in a mortar and pestle to a fine powder suitable for use in hydrogenation. The catalyst may be sized to a size less than the minimum clearance between the rotor/stator in the high shear device. In embodiments, the catalyst is sized to about 200 µm.

Example 1 hereinbelow describes preparation of a suitable activated catalyst according to this method. Example 2 hereinbelow describes the hydrogenation of vegetable oil with such an activated hydrogenation catalyst and nitrogen injection. Example 3 hereinbelow describes hydrogenation with activated catalyst without inert gas injection. Example 4 hereinbelow describes the hydrogenation obtained using activated and conventional catalyst. Example 5 describes the hydrogenation of base oil of Table 3 in the presence of activated catalyst and hexane solvent. Example 6 described preparation of activated catalyst without reactor purge.

The increased activity resulting from the disclosed activated hydrogenation catalyst and activation method results in a reduction in hydrogenation time and/or the production of hydrogenated products that comprise desirable levels of trans fats and/or saturated fats. The hydrogenated products may also have improved taste.

Catalyst activated according to this method may be utilized in a conventional hydrogenation system as shown in FIG. 1, or may be incorporated into the high shear hydrogenation system of FIG. 2. It is noted that, in certain embodiments, conditions of high temperature and pressure along with high shear contacting of the fatty acids in liquid solution 21 and hydrogen gas 22 enable hydrogenation in the absence of solid catalyst.

Heating/Cooling

As mentioned hereinabove, the use of additional external or internal heating and/or cooling heat transfer devices is also contemplated in some applications of the process. With reference to FIG. 2, suitable locations for external heat transfer devices are between reactor 10 and pump 5; between pump 5 and high shear device 40 and/or between high shear device 40 and reactor 10. There are many known types of heat transfer devices that are suitable. Examples of such exchangers are shell and tube, plate, and coil heat exchangers.

II. Hydrogenation Process

A. Conventional Hydrogenation Process

The apparatus of FIG. 1 which may be used for the hydrogenation process in some embodiments was described hereinabove. Reference to FIG. 1 will be utilized to describe the non high shear hydrogenation process used with activated catalyst, inert gas injection, and/or organic solvent addition according to embodiments of this disclosure.

A quantity of the base oil and the catalyst (and an organic solvent where indicated) is placed into reactor 10. A gas, such as nitrogen or hydrogen, for example, is then used to fill reactor 10, and purge it of any air and/or oxygen. The base oil is then heated to the specified reaction temperature, using heating mantle 30.

Hydrogen gas 29 is fed into reactor 10 at ambient temperature, and gas flow is regulated by means of a pressure relief valve (not shown) between the supply manifold (not shown) and the reactor 10.

The hydrogenation reaction is then carried out, maintaining the flow of hydrogen into the reactor, and maintaining the specified temperature for the indicated period of time. Because hydrogenation is an exothermic reaction, heating is used to initiate the reaction and the heating is then discontinued.

In larger reactors (2 liters and above) cooling coils 27 are typically incorporated to maintain the desired temperature. At the end of the reaction, heating mantle 30 is removed and reactor 10 cooled by blowing air over the reactor and then discontinuing the hydrogen flow. During cooling a vacuum may be drawn on the flask through a condenser 34 cooled by water. This may be used to extract organic solvent in embodiments wherein liquid solution in reactor 10 comprises organic solvent for improving levels of trans fat in the hydrogenated product.

The cooling process is stopped when the reactor temperature reaches ambient temperature (generally about 20° C. to about 25° C.), after which the hydrogenated reaction product is removed from the reactor via reactor discharge 20, and its composition determined.

B. High Shear Hydrogenation Process

Embodiments of the high shear hydrogenation system comprise at least one high shear device 40 for increasing solubility of hydrogen gas in the liquid phase to accelerate the rate of the gas/liquid or gas/liquid/solid reactions. Description of high shear hydrogenation method will be made with reference to FIG. 2 which is a generalized schematic of a hydrogenation system 100 which comprises one external high shear device 40. External high shear device 40 is positioned between pump 5 and reactor 10. In FIG. 2 high shear system 100 is configured as a closed system, wherein the output dispersion 18 from high shear device 40 is returned to reactor 10 for recovery of a product stream 16. This configuration is one which lends itself to multi-pass operation, for example. Upon removal from the reactor 10, product 16 may be passed to a product recovery system (not shown) for further processing. The use of dotted lines in FIG. 1 is used to point out that additional steps may be incorporated between reactor 10, external high shear device 40, and pump 5 as will become apparent upon reading the description of the high shear desulphurization process described hereinbelow.

Embodiments of the method comprise a process for the heterogeneous hydrogenation of any unsaturated oil including fats, fatty acids and/or fatty acid derivatives with hydrogen in the presence of a heterogeneous hydrogenation catalyst dispersed in the liquid phase in reactor 10. Embodiments of the process are characterized by the use of a high shear device 40 and introduction of hydrogen gas to the fatty acids prior to introduction into high shear device 40.

In embodiments, the process comprises one external high shear device 40. The external high shear device may be positioned between a feed reactant source and reactor/holding tank 10. In embodiments, reactor 10 is charged with catalyst and the catalyst activated as described in Section IB hereinabove.

In embodiments, reactants and, if present, catalyst (i.e. hydrogen gas, unsaturated fatty acids, and catalyst) may be mixed in reactor 10. In such embodiments, reactor 10 may be charged with base oil and catalyst and the mix heated under, for example, a hydrogen atmosphere. The slurry may be circulated through system 100 via pumps 5 and/or 6 and reactor outlet stream 20, pump inlet stream 21, pump outlet stream 12, high shear device inlet stream 13, dispersion 18, and reactor inlet stream 19. In alternative embodiments, reactants 18 exiting high shear device 40 are introduced into fluidized or fixed bed reactor 42 for catalysis.

Fatty acid composition through fatty acid feed stream 14 may be placed into a pressure reactor 10 which may include an internal paddle agitator (not shown in FIG. 2) and/or a cooling coil (not shown in FIG. 2). Reactor 10 may also comprise a gas injection valve, pressure relief valve, discharge valve, temperature probe, and pressure gauge, and/or heater, as described hereinabove. In some embodiments, reactor 10 comprises a continuous or semi-continuous stirred tank, and in other embodiments hydrogenation is operated as a batch process.

In embodiments, liquid solution comprising unsaturated fatty acids and optional catalyst are introduced separately into reactor 10. In embodiments, the liquid medium and catalyst are mixed prior to introduction into reactor 10. In other embodiments, the liquid solution and catalyst are introduced separately and mixed within reactor 10 via a reactor agitator (not shown in FIG. 2). Additional reactants may be added to reactor 10 if desired for a particular application. Reactants enter reactor 10 via, for example, streams 14 and 15. Any number of reactor inlet streams is envisioned, with two shown in FIG. 1 (streams 14 and 15). For example, in embodiments with inert gas injection, inert gas may be injected as gas injection 15.

In embodiments, any catalyst suitable for catalyzing a hydrogenation reaction may be employed. In embodiments, a gas such as nitrogen or hydrogen is used to fill reactor 10 and purge it of any air and/or oxygen. In embodiments, reactor 10 utilizes a hydrogenation catalyst.

In embodiments, hydrogenation reactor 10 may be charged with a catalyst and a triglyceride composition (e.g. vegetable oil, sunflower oil) and heated, as necessary, to allow the protective coating on the catalyst to liquefy. Alternatively, heating may take place under hydrogen flow.

In embodiments, the heating is done to 85° C. In embodiments, the time to melt the catalyst coating is about 10 minutes. In embodiments, following melting at 85° C. an additional amount of oil at a desired temperature is added over time to bring the resulting volume of oil to a desired temperature. For example, in embodiments, following melting at 85° C. an additional amount of oil at 50° C. is added over about 1-2 minutes to bring the resulting volume of oil to a temperature of about 60° C. Hydrogen is then continuously fed, in order to maintain desired reaction pressure. The base oil is maintained at the specified reaction temperature, using the cooling coils in the reactor to maintain reaction temperature.

Following melting additional oil may be added over a time to bring the resulting oil to a desired temperature, for example, 35° C. The present invention unexpectedly allows for hydrogenation of triglycerides at temperatures ranging from about 30° C. Because hydrogenation is an exothermic reaction, heating may be used to initially start the reaction followed by removal of the heating source.

Next, high shear device 40 is placed in operation, reactor agitation is continued, and high shear pumping of reactor fluids throughout high shear system 100 commences. Reactants are introduced into high shear device 40 and the reactants may be continuously circulated over a time period sufficient to produce a desired hydrogenated product, for example, a product having a specified purity or property value, after which the reaction is terminated.

In embodiments, dispersible gas 22 is continuously introduced into high shear system 100. Dispersible hydrogen gas stream 22 is injected into high shear device gas inlet until the pressure in reactor 10 reaches a desired range. In embodiments, dispersible gas stream 22 is introduced into high shear device 40 until a pressure of 30 psi is attained in reactor 10. In embodiments, dispersible gas stream 22 is introduced into high shear device 40 until a pressure up to about 200 psi is attained in reactor 10.

Reactor discharge stream 20 is sent to pump 5. Pump 5 serves to introduce pump inlet stream 21 which is discharge stream 20 from reactor 10 which may or may not have undergone further treatment prior to pump 5 into external high shear device 40. Pump 5 is used to provide a controlled flow throughout high shear device 40 and high shear system 100. Pump 5 builds pressure and feeds external high shear device 40. In embodiments, the pump 5 flow rate is in the range of from about 3 L/min to about 4 L/min. In this way, high shear hydrogenation system 100 combines high shear with pressure to enhance reactant intimate mixing.

As shown in FIG. 2, and mentioned hereinabove, high shear hydrogenation system 100 may comprise pump 6 positioned after high shear device 40. In this embodiment, high shear hydrogenation system 100 comprises high pressure pump 6 for boosting the pressure into reactor 10 to accelerate the reaction still further. When pump 6 is incorporated as a booster pump, pump 5 may be used as a throttling pump/valve to reduce pressure to the high shear unit 40, thus reducing wear thereof.

In a preferred embodiment, hydrogen may be continuously fed into fatty acid composition stream 12 to form high shear device feed stream 13. Dispersible hydrogen gas 22 may be combined with pump outlet stream 12 at ambient temperature, and gas flow regulated by means of a pressure relief valve (not shown) upstream of high shear device 40. In embodiments, dispersible reactant stream 22 is injected into high shear inlet stream 13 which comprises pump discharge stream 12 which optionally has undergone further processing prior to being sent to external high shear device 40.

In embodiments, dispersible gas stream 22 is combined with liquid solution 21 and the combined gas/liquid (or gas/liquid/solid) stream 13 is introduced into high shear device 40. In other embodiments, high shear device 40 comprises a gas inlet and a liquid inlet, and the dispersible gas stream 22 and liquid solution in pump outlet 21 are mixed within the high shear device, rather than externally thereto. In some embodiments, especially with regards to larger reactor systems, it may be desirable to have a separate melt and mix pot for preparing the catalyst that will then be pumped into the oil circulation stream at any point in the processes, for example adding the prepared catalyst may be added to high shear device feed stream 13, pump discharge stream 12, liquid solution 21, reactor 10, high shear device outlet dispersion 18, and/or reactor recycle inlet stream 19.

In high shear device 40 a fine dispersion of hydrogen in liquid fatty acid medium is produced which accelerates the hydrogenation reaction and enables reaction at lower operating temperatures and pressures, thereby reducing the time of reaction significantly. In high shear device 40, hydrogen and the triglyceride composition are highly dispersed such that dispersion 18 from high shear device 40 comprises nanobubbles and microbubbles of hydrogen for superior dissolution of hydrogen 22 into the fatty acids of liquid solution 21. As mentioned hereinabove, it is known in emulsion chemistry that sub-micron particles dispersed in a liquid undergo movement primarily through Brownian motion effects. The kinetics of bubble motion through boundary layers, as is present on the surface of catalyst, is thus enhanced due to the formation of sub micron sized bubbles being formed in high shear device 40.

In embodiments, once dispersed, the hydrogen-triglyceride mix exit external high shear device 40 as high shear device outlet dispersion 18. Stream 18 may optionally enter fluidized or fixed bed 42 in lieu of a slurry catalyst process. However, in some slurry catalyst embodiments, high shear outlet stream 18 directly enters hydrogenation reactor 10 as reactor recycle inlet stream 19 where the hydrogenation reaction can propagate. Reactor recycle stream 19 is high shear device discharge stream 18 which optionally has undergone further processing prior to recycle to reactor 10.

When catalyst is present in the charged system (as per a slurry reaction system) and temperatures and pressures suitable for inducing hydrogenation reaction present, hydrogenation can occur outside reactor 10. It is noted that a significant portion of the reaction may take place in high shear device 40. In embodiments, when system 100 is operated such that conditions outside the high shear device 40 are not suitable to promote hydrogenation (e.g., suitable conditions of 35° C. and 60 psi), greater than 90% of the reaction may occur within high shear device 40 (see, for example, Example 7 hereinbelow). In embodiments, significant hydrogenation occurs between the pump 5 and outlet 18 of high shear unit 40.

If sufficient residence time exists within high shear hydrogenation system 100 to carry out the desired reaction, a reactor 10 may not be required in certain embodiments. In embodiments, reactor 10 may be used mainly for cooling of fluid, as much of the reaction occurs in external high shear device 40. The triglyceride composition may be maintained at the specified reaction temperature, by removing reaction heat from reactor 10 or elsewhere throughout system 100 via any method known to one skilled in the art.

In embodiments, the reaction fluid is continuously circulated and the reaction continues over a time period sufficient to produce a desired product, for example, a hydrogenated product 16 having a specified iodine value, after which the reaction is terminated as known to those of skill in the art. The hydrogenation reaction may be allowed to propagate in reactor 10 maintaining the specified temperature for the indicated period of time.

The cooling process is stopped when the reactor temperature reaches ambient temperature (generally about 20° C. to about 25° C.). Product stream 16 comprises hydrogenated fatty acids. Vent gas may exit reactor 10 via vent stream 17, while hydrogenated product may be extracted from high shear system 100 via product stream 16. In embodiments, reactor 10 comprises a plurality of reactor product streams 16. The hydrogenated oil product 16 may be filtered and then directly fed into a transportation vessel or finished into forms such as flakes or other forms commonly known to those in the art.

In embodiments, upon completion of reaction, gas is removed from the product via reactor gas outlet 17. Reactor gas outlet 17 may comprise unreacted hydrogen, for example. Gas removed via reactor gas outlet 17 may be further treated and/or recycled, using known techniques. In some applications, as depicted in FIG. 3, the unreacted hydrogen is removed via reactor gas outlet 17 is recovered and injected directly back into the inlet of high shear device 40 as a gas in dispersible gas stream 22.

Multiple high shear devices can be utilized to entrain hydrogen as needed for the desired reaction. In some embodiments, two or more high shear devices 40 are aligned in series, and are used to further enhance the reaction. Their operation may be in either batch or continuous mode. In some instances in which a single pass or "once through" process is desired, the use of multiple (i.e., two or more) high shear devices in series may also be advantageous. The use of multiple high shear reactors may enable one pass hydrogenation to the desired degree of saturation. In some embodiments where multiple high shear devices 40 are operated in series, reactor 10 may not be employed. In other embodiments, multiple high shear devices 40 are operated in parallel, and the outlet dispersions therefrom introduced into one or more reactors 10.

FIG. 4 illustrates an embodiment of high shear system 100 where two high shear units 140 and 140A are utilized in series to further promote reactions. Multiple high shear devices 140 and 140A may also be utilized in conjunction with fixed catalyst bed reactor(s) such as fixed catalyst bed 142 in FIG. 4. FIG. 4 is numbered so that similar components have the same number as in FIG. 2 with 100 added thereto. For example, the number 118 is used to refer to the high shear dispersion outlet stream in FIG. 4, while 18 is used to refer to the high shear dispersion outlet of FIG. 2.

Operating Conditions

A. Temperature

The reaction may proceed under temperature and pressure conditions commonly employed in such catalytic hydrogenation reactions. In embodiments, the reaction temperatures are in the range of from 60° C. to 260° C. In some embodiments, operating conditions comprise a temperature in the range of from about 100° C. to about 230° C. In embodiments, the reaction temperature is less than 220° C. In some embodiments, the temperature is in the range of from about 160° C. to 180° C. In some specific embodiments, the reaction temperature is in the range of from about 155° C. to about 160° C. In some embodiments, particularly when low trans formation is desirable, the hydrogenation is effected at a temperature substantially in the range of from about 25° C. to about 60° C. In other embodiments, the hydrogenation is effected at a temperature substantially in the range of from about 30° C. to about 40° C.

B. Pressure

Reaction conditions used in the process of the invention are broadly those known in the art for the catalytic hydrogenation of unsaturated fatty acids, fats, and derivatives thereof. Generally the hydrogen pressures are in the range of from 0.5 to 300 bar. In some embodiments, the reaction pressure is in the range of from about 2 atm to about 55-60 atm. In embodiments, reaction pressure is in the range of from about 8 to about 15 atm. In embodiments, reaction pressure is less than about 1000 psi. Alternatively, in some embodiments, the operating pressure is less than about 500 psi. In some embodiments, the operating pressure is less than about 450 psi. In some embodiments, the operating pressure is less than about 200 psi. In some embodiments, the operating pressure is less than about 100 psi.

In some instances, it is desirable to further enhance the degree of hydrogenation. Increasing reaction pressure increases reaction rate, but also increases wear of the materials constituting the reactors, the piping, and the mechanical parts of the plant, as well as the ancillary devices. The superior dissolution and/or dispersing provided by the external high shear mixing may allow a decrease in operating pressure while maintaining or even increasing reaction rate. The use of the high shear device may allow instantaneous conditions locally within the reaction mixture whereby hydrogenation of fatty acids occurs under overall conditions of temperature and pressure under which hydrogenation would not conventionally occur.

The hydrogenation of fatty acids is conventionally carried out at pressures in the range of 60 to 100 pounds per square inch and temperatures in the 100° C. to 175° C. range over several hours. External high shear device 40 is an enclosed unit wherein the temperature and pressure within the high shear unit(s) can be controlled, thus, when the process utilizes a high shear device, accelerated hydrogenation occurs at lower operating temperatures and pressures, thereby reducing the time of reaction significantly. The use of an external high shear device 40 is more economically favorable than a conventional mixer placed within a large reactor, whereby the maintenance of temperature and pressure of the entire large reactor unit (with associated integrated/internal mixer) requires a greater capital investment in order to control the temperature and pressure of the larger reactor vessel. The instantaneous pressure and temperature conditions within the high shear device 40 also allow for hydrogenation under reduced temperatures that reduce trans fat formation as demonstrated in Example 7.

In embodiments, utilization of at least one high shear device 40 enables operation of reactor 10 at near atmospheric pressure. In some embodiments, the method and system of this disclosure make possible the design of a smaller and/or less capital intensive process than previously possible without the incorporation of external high shear device 40. Thus, in certain embodiments of the disclosed method, capital costs for the design of new high shear hydrogenation systems are reduced relative to conventional (non high shear) hydrogenation systems. In alternative embodiments, the disclosed method reduces operating costs/increases production from an existing process.

C. Time of Reaction

Use of the disclosed process comprising at least one external high shear device 40 allows increased hydrogenation of unsaturated fatty acids and/or an increase in throughput of the reactants, by accelerating the hydrogenation reaction. In some embodiments, the method comprises incorporating external high shear device 40 into an established process, thereby making possible an increase in production (greater throughput) compared to a similar process operated without high shear device 40. In embodiments, the use of shear in hydrogenation of fatty acids enables a reaction time that is less than half the time of conventional reaction times for producing products such as fully hydrogenated oils.

D. Gas Flow Rate

In embodiments, the gas-through flow of dispersible gas stream 22 is in the range of from about 1 to about 6 Nm³/h.

Hydrogenation Results

Potential benefits of the disclosed system, method, and catalyst activation for the hydrogenation of fatty acids include, but are not limited to, faster cycle times, increased throughput, reduced trans fats, increased yield of hydrogenates, and/or reduced operating costs and/or capital expenses due to the possibility of designing smaller reactors and/or operating the hydrogenation process at lower temperature and/or pressure.

In embodiments, the disclosed high shear process comprising reactant mixing via external high shear device 40 allows use of lower temperature and/or pressure in reactor 10 than previously enabled. In embodiments, the method comprises incorporating external high shear device 40 into an established process thereby reducing the operating temperature and/or pressure of the reaction in external high shear device 40 and/or enabling the increase in production (greater throughput) from a process operated without high shear device 40.

In embodiments, the method and system of this disclosure enable design of a smaller and/or less capital intensive process allowing selection of a reactor 10 having lower operating temperature and/or pressure capability than previously possible without the incorporation of external high shear device 40. As mentioned hereinabove, utilization of at least one high shear device 40 enables operation of reactor 10 at near atmospheric pressure in some embodiments.

Table 2 shows representative values from a commercial hydrogenation plant using what the authors refer to as a "Type A activated low trans Ni-catalyst" (Paper presented by A. Beers et al., 2006 AOCS Annual Meeting, St. Louis, Mo., May 2006) for minimizing the trans fat content produced during hydrogenation. Beers et al. indicate that linolenic acid ($C_{18:3}$) is a fatty acid that is sensitive to oxidation, and under ideal conditions, it is desirable to hydrogenate it to oleic acid ($C_{18:1}$), rather than the more saturated stearic acid ($C_{18}$). The results achieved with embodiments of the present invention produce a more desirable hydrogenated triglyceride with lower total trans fat content and/or lower saturated fat content ($C_{18:0}$) than conventional hydrogenation systems and methods.

TABLE 2

Typical Analysis of Commercially Hydrogenated Soy Oils

| | Non-Hydrogenated Soy Bean Oil Feedstock (Base Oil) | Following Hydrogenation* |
|---|---|---|
| Iodine Value | 130 | 114 |
| Hydrogenation Temperature (° C.) | NA | 82-110 |
| Fatty Acid Wt % | | |
| C18:0 | 3.8 | 6.8 |
| C18:1 | 23.8 | 36 |
| C18:2 | 53.0 | 42 |
| C18:3 | 6.7 | 3.9 |
| Total Trans Fat wt % | | 6 |

*Activated Low Trans Nickel catalyst Type 'A' under typical commercial operating conditions and $H_2$ used at a pressure of 70 psi. (~5 Bar)

In some embodiments, dispersing hydrogen in a liquid medium via the disclosed system and method, activating the hydrogenation catalyst as disclosed herein, and/or utilizing inert gas injection decreases the amount of trans fats and/or the amount of unsaturated fat. In embodiments, the hydrogenation yields a hydrogenated product having a degree of unsaturation as measured by iodine value of less than about 100. In embodiments, the hydrogenated product 16 has a saturated fat content (as C18:0) of less than about 11%. In embodiments, the hydrogenated product 16 has a saturated fat content (as C18:0) of less than about 10%.

In embodiments the total amount of trans fats is reduced by more than about 15%. In embodiments, the iodine value is reduced by about 15%. In embodiments, the high shear hydrogenation system and method produce a "zero trans fat" product. The hydrogenated oil produced may comprise less than 10 weight % of trans fatty acids.

In embodiments, the system and method produce a hydrogenated oil having a ratio of oleic acid (C18:1) to stearic acid (C18:0) of less than about 30%. The hydrogenated product may comprise less than 5 weight % of linolenic acid (C18:3). %. In embodiments, the hydrogenated product may comprise less than about 1 weight % of linolenic acid (C18:3).

Example 7 hereinbelow describes the results obtained using the high shear method and system according to FIG. 2 of the present disclosure for hydrogenation. Example 8 describes the results of hydrogenation of soy oil via the disclosed high shear hydrogenation method and system compared to results obtained with a conventional hydrogenation system. Analysis of the bubbles produced with the high shear device is presented in Example 9 hereinbelow. Example 10 hereinbelow discloses results obtained using a fixed catalyst bed in the high shear system and method of FIG. 2.

Other Systems

The disclosed system and method may be utilized to enhance the rate of other hydrogenation reactions. For example, in some embodiments, the disclosed process is used for the hydrogenation of residual oil. Hydrogenation could also involve selective hydrogenation of acetylene to ethylene, or hydrogenation of propadiene to olefins. Acetylenes and dienes are undesired products produced in the cracking of ethane, propane and higher molecular weight hydrocarbons. The undesired products are currently removed from the product streams through selective hydrogenation. Aromatics are also produced in high temperature cracking of naphthalene. Some of these aromatics must be hydrogenated prior to use. Poly nuclear aromatics are frequently hydrogenated to minimize health effects of PAN. It is to be understood that the herein disclosed process is also suitable for hydrogenation processes other than the hydrogenation of fatty acids.

EXAMPLES

In the examples contained herein the fatty acid composition of the triglycerides was obtained using AOCS Official Method Ce 2-66 (American Oil Chemists' Society (("AOCS")), 2211 W. Bradley Ave., Champaign, Ill.), and the measurement of cis and trans isomers was performed in accordance with test methods as described in AOCS Official Method Ce 1c-89. The iodine value was determined by the AOCS Recommended Practice Cd 1c-85.

Example 1

Preparation of Activated Catalyst

A commercially available hydrogenation catalyst, NYSO-FACT®120 was obtained from Engelhard Corporation, Erie, Pa. NYSOFACT® 120 is a nickel silicate catalyst, with approximately 22% by weight Ni content. The catalyst is supplied as solid 'droplets' that are coated with a protective hydrogenated vegetable oil that has been hydrogenated to a point where the material is solid at room temperature. This hydrogenated oil coating serves as a protective barrier to reduce reaction of the catalyst with oxygen in the air.

The NYSOFACT® 120 was activated as follows prior to its use in hydrogenation. The system used to activate the catalyst is shown in FIG. 5. One hundred grams (100 g) of NYSO-FACT® 120 was placed in a 500 ml reactor 10 which was then heated using a heating mantle 30. In these examples, the 500 mL reactor was obtained from Autoclave Engineers, Inc. (Erie, Pa.).

The catalyst was heated from ambient temperature to a temperature sufficient to melt the wax coating. In the case of NYSOFACT®120 this temperature is 80° C. Once the wax coating had melted, the reactor 10 was sealed and hydrogen flow was started. A second gas inlet valve 15 was used to allow other nonoxidizing gasses, such as nitrogen or hydrogen, for example, to be used in this step where the main purpose is to inhibit oxidation of the catalyst.

The reactor agitator 28 was started and run at 1000 rpm for the remainder of the reaction time. Hydrogen gas at a temperature of 150° C., a flow rate of 3-5 SCFH (Standard cubic feet per hour) at 20 psi was continuously added into the reactor for a period of 2 hours. Excess hydrogen and other volatiles were removed from the reactor through a vent 17. In this embodiment of the present invention, bleeding the reactor allowed for removal of water that formed as the hydrogen reacted with the catalyst to activate it.

Following 2 hrs at 150° C. the reactor was allowed to air cool to 100° C. while maintaining hydrogen pressure (20 psi) in the reactor. The activated catalyst was then transferred into a sealed drying dish 44 that was flushed with nitrogen and then kept under vacuum (from vacuum pump 46) all the time avoiding contact with any source of oxygen or moisture that can deactivate the catalyst. Once cooled to room temperature the activated catalyst (designated CAT1) was sized in a mortar and pestle to a fine powder having a particle size of less than about 200 micron (70 mesh).

Example 2

Hydrogenation of Vegetable Oil with Activated Hydrogenation Catalyst and Nitrogen Injection For this Example, the base oil was a non-hydrogenated soy oil that is refined but not deodorized or bleached, and was obtained from ADM Corp, Decatur, Ill. An analysis of the base soy oil of this example is shown in Table 3.

TABLE 3

| Fatty acid analysis of Base Soy Oil | |
|---|---|
| | Wt % |
| Fatty Acid Composition | |
| C18:0 | 4.6 |
| C18:1 | 23.8 |
| C18:2 | 52.4 |
| C18:3 | 6.8 |
| Trans Fat | |
| C18:1 trans | 0 |
| C18:2 trans | 0.2 |
| C18:3 trans | 0.5 |
| Total Trans Fats | 0.7 |
| IV (cg iodine/gm) | 129.6 |

Two grams (2 g) of the non-activated catalyst from Example 1 were placed in a 500 ml autoclave reactor of Example 1 equipped with pressure gauge, mechanical agitator and thermocouple. Two hundred milliliters (200 ml) of the base soy oil was placed in the reactor and the reactor purged.

The reactor was sealed and pressurized with nitrogen to 20 psi. The reactor was heated to a temperature sufficient to insure all the hardened fat on the catalyst is melted and dispersed, (in this example, 80° C. was sufficient) and then cooled to 60° C. with agitation. Hydrogen gas was introduced and the pressure maintained at 100 psi for 120 minutes.

The reactor was then cooled in air to ambient temperature (generally ranging from about 20° C. to about 25° C.), during which time hydrogen was flushed through the reactor.

A sample of the resultant hydrogenated oil was analyzed, and the results shown in Table 4.

TABLE 4

| Composition of Soy Oil Hydrogenated with Non-Activated Catalyst | |
|---|---|
| | Wt % |
| Fatty Acid Composition | |
| C18:0 | 10.9 |
| C18:1 | 35.4 |
| C18:2 | 39.2 |
| C18:3 | 2.9 |

TABLE 4-continued

Composition of Soy Oil Hydrogenated
with Non-Activated Catalyst

|  | Wt % |
|---|---|
| Trans Fat | |
| C18:1 trans | 3.2 |
| C18:2 trans | 1.5 |
| C18:3 trans | 0.4 |
| Total Trans Fats | 5.1 |
| IV (cg iodine/gm) | 106.1 |

The results show a significant drop in IV value but with an increase in the level of trans fatty acids which is less than that obtained using commercial methods, such as with a conventional nickel catalyst (5.1% vs. 6%; compare to Table 2). As known to those experienced to those in the art, iodine value is an indicator of the number of double bonds in the oil. When hydrogenated, the hydrogen combines with the double bonds and the iodine value is reduced.

Example 3

Hydrogenation with Activated Catalyst without Inert Gas Injection

This example followed the same procedure as in Example 2, except hydrogen (at 100 psi) was used where instead of the nitrogen gas used in Example 2. The results are shown in Table 5.

TABLE 5

Composition of Hydrogenated Soy Oil, No Nitrogen

|  | % Wt |
|---|---|
| Fatty Acid Composition | |
| C18:0 | 14.5 |
| C18:1 | 39.3 |
| C18:2 | 32.8 |
| C18:3 | 1.9 |
| Trans Fat | |
| C18:1 trans | 4.4 |
| C18:2 trans | 1.7 |
| C18:3 trans | 0.3 |
| Total Trans | 6.4 |
| IV (cg iodine/gm) | 95.7 |

The lower IV value of the hydrogenated oil in this Example, compared to the results shown in Example 2, suggests that there was a significant amount of hydrogenation occurring during the initial heat up and dispersing of the catalyst at the elevated temperature, resulting in a modest but undesirable increase in total trans fatty acid content. The data of Example 3 demonstrates the need to maintain as low a temperature as practical during hydrogenation. Ideally a commercial system would be configured to minimize trans formation with the oil heated to no greater than about 35° C.

Example 4

Comparative Hydrogenation: Activated and Non-Activated Catalyst

To demonstrate the increased activity level of the catalyst that was activated in Example 1 ("Activated N120", Table 6) compared to the non-activated catalyst ("N120"), samples of oil were hydrogenated under similar conditions.

A quantity of 100 mL of base oil was used. The reactor was initially charged to 45 psi with $CO_2$. Hydrogen was then added to a total pressure of 200 psi. Additional $H_2$ was added as needed during the reaction to maintain 200 psi, as hydrogen was consumed in the reaction process. The initial charging using a nonoxidizing gas, for example, such as $CO_2$ or He, negates the effect of hydrogenation at elevated temperatures (e.g., 80° C.) while melting the catalyst.

The results are shown in Table 6. The results show that under identical conditions the untreated catalyst has very little hydrogenation activity as evidenced in the Iodine Values (125.5) which shows little change from the IV of the base oil (IV of 129). The activated catalyst shows a significant decrease in Iodine Value (to IV of 101.6) under the same conditions. The non-modified catalyst is typically used in commercial hydrogenation processes at a temperature of from 100° C. to about 120° C. The disclosed catalyst activation thus enables effective use of catalyst at lower operating temperatures (60° C. in this example) while maintaining a significant extent of hydrogenation.

TABLE 6

Operating Conditions and Analysis of Oil Composition
For Activated and Non-Activated Catalyst

|  | Non-activated Catalyst | Activated Catalyst |
|---|---|---|
| Fatty Acid Composition | | |
| C18:0 | 5.6 | 9.5 |
| C18:1 | 26.6 | 42.5 |
| C18:2 | 49.9 | 34.9 |
| C18:3 | 6.1 | 1.7 |
| Trans Fat | | |
| C18:1 trans | 0.8 | 4.6 |
| C18:2 trans | 0.5 | 2.8 |
| C18:3 trans | 0.5 | 0.3 |
| Total Trans Fat | 1.8 | 7.7 |
| IV | 125.5 | 101.6 |
| PSI $H_2$ | 145 | 145 |
| $CO_2$ | 45 | 55 |
| Temp (° C.) | 60 | 60 |
| Time (h) | 0.75 | 1 |
| Catalyst (g) | 2 | 2 |
| Pressure at pump discharge, psig | 200 | 200 |
| Catalyst type | N120 | Activated N120 |

Example 5

Hydrogenation Using Activated Catalyst and Hexane Solvent

Hydrogenation was performed using the same procedure as in Example 2, except that hexane was added to the base oil at a ratio of 10 parts oil to 4 parts hexane (1000 ml base oil and 400 ml hexane). A 2 liter reactor was obtained from Parr, Inc. (Moline, Ill.) in a setup according to FIG. 1.

The hydrogen pressure was 60 psi and the reaction temperature was 35° C. Catalyst addition was at a ratio of 1 part catalyst to 500 parts oil. The results are presented in Table 7.

TABLE 7

Analysis of Oil Composition for
Activated and Hexane Solvent

| | % Wt |
|---|---|
| Fatty Acid Composition | |
| C18:0 | 10.2 |
| C18:1 | 34.9 |
| C18:2 | 40.0 |
| C18:3 | 3.3 |
| Trans Fat | |
| C18:1 trans | 2.8 |
| C18:2 trans | 1.3 |
| C18:3 trans | 0.4 |
| Total Trans Fat | 4.5 |
| IV (cg iodine/gm) | 108 |

This example illustrates the ability to reduce total trans fat levels while also achieving relatively low levels of stearic ($C_{18:0}$) and linolenic ($C_{18:3}$) acids. The activated catalyst also is surprisingly active at the reaction conditions of 35° C.

Example 6

Catalyst Preparation without Purging Reactor

In this example, the activated catalyst was evaluated to determine if purging of the reactor during catalyst activation is a significant factor in producing a hydrogenation catalyst that is exceptionally active even at lower temperatures.

A catalyst was prepared as described in Example 1, except the reactor was sealed and no gas was purged from the reactor during preparation of the activated catalyst; the resulting catalyst was designated CAT2.

The following table illustrates the effect of a catalyst prepared by the inventive process, Activated N120 (also designated as "CAT1") compared with CAT2 described above.

TABLE 8

Catalyst Preparation With and Without Purging Reactor

| | CAT2 | CAT1 (Activated N120) |
|---|---|---|
| FA Composition | | |
| C18:0 | 5.6 | 9.5 |
| C18:1 | 26.6 | 42.5 |
| C18:2 | 49.9 | 34.9 |
| C18:3 | 6.1 | 1.7 |
| Trans Fat | | |
| C18:1 trans | 0.8 | 4.6 |
| C18:2 trans | 0.5 | 2.8 |
| C18:3 trans | 0.5 | 0.3 |
| Total Trans Fat | 1.8 | 7.7 |
| IV | 125.5 | 101.6 |
| PSI $H_2$ | 145 | 145 |
| $CO_2$ | 45 | 55 |
| $N_2$ | 0 | 0 |
| Temp (° C.) | 60 | 60 |
| Time (h) | 0.75 | 1 |
| Catalyst (g) | 2 | 2 |
| Pressure (psi) | 200 | 200 |

The results show that under similar reaction conditions the catalyst prepared without purging the reactor during modification of the catalyst (CAT 2) showed no significant activity while the inventive catalyst CAT 1 showed a significant reduction in Iodine Value (to 101.6) from that of the base oil (IV of 129).

Example 7

Effect of High Shear Mixing to Reduce Reaction Times while Maintaining Low Trans Fat Levels An external IKA MK 2000 mill 40 (Registered trademark of IKA Works, Inc Wilmington, N.C.) was connected to a 10 liter stirred reactor 10 as shown in FIG. 2. The 10 liter reactor was made by welding a section of 10 inch diameter stainless steel pipe with a base plate and a head plate equipped with an agitator shaft and seal.

The reactor 10 was charged with catalyst and base oil (see Table 3) and heated to 85° C. (using a heating mantle) to allow the coating on the catalyst to dissolve. Care was taken to avoid any oxygen contact with the catalyst. Hydrogen gas was introduced into the system. The reactor was equipped with an external gear pump to allow for circulation of the oil/catalyst through the IKA high shear device and the reactor. The reactor was equipped with an internal water cooling coil for controlling reactor temperature during the exothermic hydrogenation reaction.

Once the reactor reached 85° C. and the protective droplets of the catalyst were adequately liquefied, the temperature was reduced to 35° C. and hydrogen continually added to maintain the specified pressure. The reactor temperature was cooled to maintain a temperature of 35° C., and the analysis of the resulting hydrogenated oil is shown in Table 9.

TABLE 9

Fatty Acid Composition of Oil Hydrogenated at 35° C.

| | % Wt |
|---|---|
| FA Composition | |
| C18:0 | 7.3 |
| C18:1 | 36 |
| C18:2 | 42.3 |
| C18:3 | 3.2 |
| Trans Fat | |
| C18:1 trans | 4.4 |
| C18:2 trans | 1.6 |
| C18:3 trans | 0.2 |
| Total Trans Fats | 6.2 |
| IV | 112.7 |
| PSI $H_2$ | 60 |
| Temp (° C.) | 35 |
| Time (h) | 1 |
| Catalyst (g) | 1/100 ml oil |
| Pressure (psi) | 60 |
| Catalyst type | CAT 1 |

The results indicate a very low level of trans fats, low level of saturated fats and a low level of linolenic acid, C18:3. This was done by carrying out the hydrogenation in a period of approximately 1 hour and at a low temperature (35° C.). By comparing the iodine value of the hydrogenated oil (IV of 112.7) with the iodine value of the starting oil (IV of 129, see Table 3), hydrogenation under this low temperature condition equates to change in iodine value of approximately 16 units per hour.

Example 8

Comparison of High Shear Device over Conventional Hydrogenation Reactions

Two different experimental set-ups, corresponding to FIGS. 1 and 2 were utilized to compare hydrogenation under conventional hydrogenation process (i.e. FIG. 1 process) and high shear process (present disclosure process of FIG. 2). For both set-ups, the raw oil or base oil was refined, bleached and deodorized non-hydrogenated soy oil supplied by Archer Daniel Midland Corp of Decatur, Ill. For both set-ups the catalyst used was a commercially available hydrogenation catalyst, NYSOFACT®120 obtained from Engelhard Corporation, Erie, Pa. In the following examples active catalyst sites were exposed prior to utilizing the catalyst by heating the catalyst to 85° C. In the Examples which follow, the hydrogen used was Purified Hydrogen Gas, Standard IS:HY 200, Grade II having a purity of 99.9% (+), and was obtained from Airgas Corp. Other gases used were of similar quality.

A 2 L reactor in a conventional soy oil hydrogenation configuration was used to carry out hydrogenation according to the FIG. 1 set-up. The reactor 10 used was a 2 liter reactor from Parr, Inc. (Moline, Ill.). The PARR was equipped with a paddle agitator 28 run at 1000 rpm during the reaction. Hydrogen 16 injected into the PARR 10 directly at the pressure indicated.

Reactor 10 was charged with catalyst and 100 mL of raw soy oil and heated to 85° C. (using a heating mantle 30) under hydrogen flow to allow the coating on the catalyst to dissolve. Time to melt the catalyst coating and 100 mL of oil was approximately 10 minutes. Following melting at 85° C. an additional 700 mL of raw soy oil at 50° C. was added over approximately 1-2 min to bring the resulting 800 mL of oil to 60° C. Hydrogen 16 was then continuously fed to reactor 10, in order to maintain desired reaction pressure. The base oil was maintained at the specified reaction temperature, using the cooling coils in the reactor (not shown in FIG. 2) to maintain reaction temperature.

Hydrogen gas 16 was fed into reactor 10 at ambient temperature, and gas flow regulated by means of a pressure relief valve (not shown) between the supply manifold (not shown) and reactor 10.

The hydrogenation reaction was then carried out, maintaining the flow of hydrogen into the reactor, and maintaining the specified temperature for the indicated period of time. Because hydrogenation is an exothermic reaction, heating was used initially to start the reaction followed by removal of the heating source.

The cooling process was stopped when the reactor temperature was ambient temperature (generally about 20° C. to about 25° C.), after which the hydrogenated reaction product was removed from the reactor, and its composition determined.

A second set-up, according to an embodiment of the present disclosure and depicted in FIG. 2, incorporated a high shear colloid mill/high shear device 40 in combination with an 8 L vessel that acts as a reactor/holding tank 10. An external IKA MK 2000 mill (high shear device 40), registered trademark of IKA Works, Inc Wilmington, N.C., was connected to the 8 liter stirred reactor.

In this set-up, external high shear device 40 was positioned between the hydrogen source and reactor 10. The reactor 10 was charged with catalyst and 1 liter of raw soy oil and heated to 85° C. (using a heating mantle) to allow the coating on the catalyst to dissolve. Care was taken to avoid any oxygen contact with the catalyst. Hydrogen gas was introduced into the system. Heating to 85° C. took approximately 10 min. Following melting at 85° C., an additional 7 L of raw soy oil at 25° C. was added over approximately 1-2 min to bring the resulting 8 L of oil to 35° C.

The reactants were then introduced into high shear device 40 where the oil was continually circulated and the reaction continued over a time period sufficient to produce a hydrogenated product having a specified iodine value, after which the reaction was terminated. The reactor was equipped with an external gear pump 5 to allow for circulation of the oil/catalyst through high shear hydrogenation system 100. Reactor 10 was equipped with an internal water cooling coil for controlling reactor temperature during the exothermic hydrogenation reaction. Injection of hydrogen 22 to high shear device 40 was at the high shear inlet 13. The dispersion 18 of the high shear device 40 was introduced into the 8 L stainless vessel 10 that was operated at atmospheric pressure. Flow through the high shear device 40 was controlled by a gear pump 5 with suction gravity fed from the 8 L stainless vessel 10 and discharged into the inlet 12 of high shear device 40. The inlet pressure to high shear device 40 was approximately 200 psi.

Once the reactor reached 35° C., hydrogen was continuously added to maintain the specified pressure. The reactor temperature was cooled to maintain a temperature of 35° C. Analyses of the hydrogenated oil produced with and without the external high shear device as well as the base oil analysis are shown in Table 10.

TABLE 10

Fatty Acid Composition of Oil Hydrogenated at 35° C.

|  | Raw Oil BMW-17-A | PARR BMW 30-9 | High Shear BMW 110-45B |
|---|---|---|---|
| FA Composition |  |  |  |
| C18-0 | 4.6 | 5.1 | 7.1 |
| C18-1 | 23.8 | 23.9 | 31 |
| C18-2 | 52.4 | 52 | 45.1 |
| C18-3 | 6.8 | 7.1 | 5.2 |
| Trans Fat |  |  |  |
| C18-1 trans | 0 | 0.2 | 2.6 |
| C18-2 trans | 0.2 | 0.5 | 1.1 |
| C18-3 trans | 0.5 | 0.7 | 0.3 |
| Total Trans | 0.7 | 1.4 | 4 |
| IV | 130 | 130 | 119 |
| PSI $H_2$ |  | 80 |  |
| Reaction Temp, ° C. |  | 60 | 50 |
| Reaction Time (h) |  | 2 | 2 |
| Catalyst (g/100 mL oil) |  | 0.01 | 0.01 |
| Reactor 10 Pressure |  | 100 | Atmospheric |
| Pump 5 Discharge pressure |  | N/A | 205 |

The iodine value (IV) of the raw oil as indicated in Table 1 was 129.6. The results indicate that the PARR operated under $H_2$ pressure of 80 psi and 60° C. showed little to no hydrogenation reaction as indicated by the iodine value, while the process utilizing the high shear device yielded a significant reduction in IV value indicating a high degree of hydrogenation had occurred.

Example 9

High Shear Bubble Analysis

Figure 6:
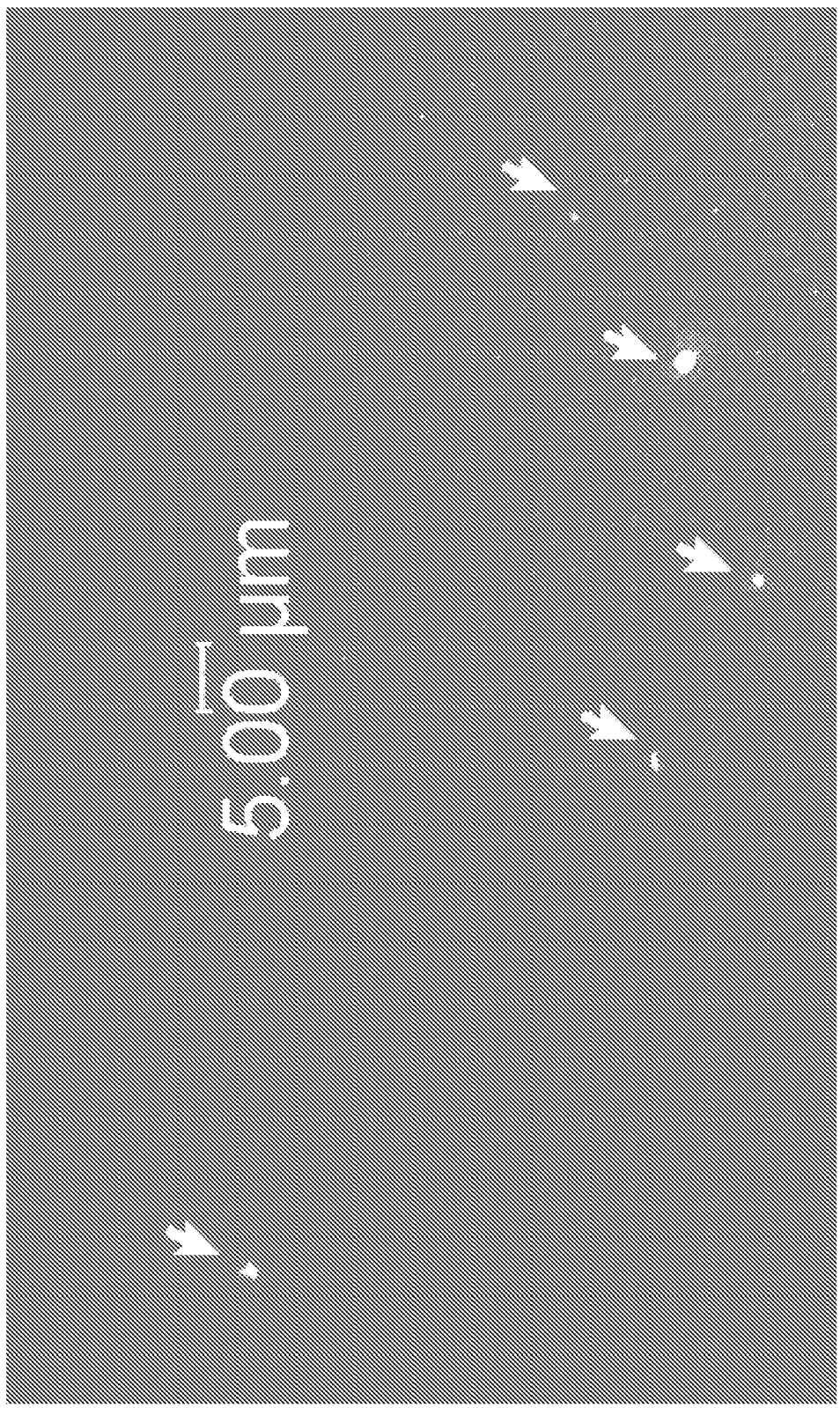
FIG. 6 is a photomicrograph (20× and 50× magnifications) of a sample of oil taken from the outlet of the high shear device and analyzed for bubble size.

A sample of oil from Example 8 was taken at the outlet of the colloid mill and analyzed for bubble size by photomicrographic means using 20× and 50× magnification. A photomicrograph of the hydrogen gas dispersed in soy oil with the use of a high shear device is presented as FIG. 6. The observed bubbles ranged from less than about 0.5 microns to about 2 microns. Although not wanting to be bound by any particular theory, bubble size can be expected to be a key factor in the ability of reactants to collide and react with one another in any gas/liquid or gas/liquid/solid reaction. Given the ideal gas laws, it can be calculated that under pressure, the surface area available for mass transfer from a bubble is inversely proportional to the bubble diameter. Therefore the mass transfer area increases by a factor of 200 when bubble size is reduced from 1 mm to 5 microns and the rate would increase by 2000 on a reduction of the bubble size to 0.5 microns.

Example 10

Hydrogenation Using Fixed Bed Catalyst and High Shear

An experiment was performed using the fixed bed design as shown in FIG. 2, fixed bed catalyst reactor 42. The results are presented in Table 11. The fixed bed catalyst enclosure 42 was a Titan Simplex Basket Strainer (Titan Co Lumberton, N.C.) Model BS 35-SS (SA6767 C) packed with 230 grams of Sud Chemie NiSat 310 RS catalyst (Süd-Chemie Inc., Louisville, Ky.). Mesh was fitted to the top of the basket and a lock ring was fabricated to hold the mesh in place thus maintaining the catalyst in the fixed bed catalyst enclosure.

The Titan Basket Strainer 42 was piped into the system between the high shear unit 40 and the stirred reactor 10. There was a by-pass 19 around the fixed bed catalyst enclosure 42 to regulate flow through the catalyst on start up and shut down.

To initially activate the fixed bed catalyst 42, 8 liters of Base Oil (see Table 3) was added to the reactor 10. In order to inert the system purging it of oxygen, full vacuum was drawn on the entire system 100. The system 100 was then purged with nitrogen. This process was then repeated pulling full vacuum followed by purging with nitrogen. After the second purging the 1 inch stainless steel valves in the inlet and outlet of the strainer basket were closed isolating the catalyst fixed bed. Full vacuum was pulled on the system 100 a third time followed by nitrogen purging. Pure hydrogen was introduced 22 and the valves on the inlet and outlet of the strainer basket were fully opened and the by-pass 19 closed. The high shear unit 40, gear pump 5, reactor 10 stirrer were then started. The system was maintained at 150° C. with a constant hydrogen pressure of 60 psi for a period of 4 hours. After 4 hours, the system was shut down, and the oil was decanted. The catalyst was at this point fully activated.

Hydrogenation Process: 8 Liters of fresh Base Oil were added to reactor 10. A vacuum was pulled on reactor 10 for 30 min and the oil was heated to 150° C. while the pump 5 and high shear unit 40 were started. Hydrogen gas 22 was then introduced until the pressure of reactor 10 reached 100 psi and the pressure of pump discharge 12 from pump 5 was 225 psi. Hydrogen flow 22 was controlled to maintain reactor pressure while a small volume of gas (1-2 bubbles/sec through a ⅛ in diameter copper tube) was allowed to vent through reactor outlet 17. The hydrogen feed was maintained for 2 hr 20 min and then discontinued along with pump 5 and high shear device 40 and the pressure was reduced to atmospheric on system 100. The oil was then allowed to cool to room temperature and analyzed. The results of the analysis are shown in Table 11. The data show a significant reduction in iodine value indicating that hydrogenation was occurring.

TABLE 11

High Shear Hydrogenation Results using Fixed Catalyst Bed Soybean Oil

| Fatty Acid Composition | Method | FB-01 |
|---|---|---|
| C8 (Octanoic Acid) | AOCS Celc-89 | |
| C10 (Capric Acid) | AOCS Celc-89 | |
| C12 (Lauric Acid) | AOCS Celc-89 | |
| C15 (Pentadecanoic Acid) | AOCS Celc-89 | |
| C15-1 (Pentadecanoic Acid) | AOCS Celc-89 | |
| C16 (Palmitic Acid) | AOCS Celc-89 | 10.7 |
| C16-1 (Palmitoleic Acid) | AOCS Celc-89 | |
| C17 (Heptadecanoic Acid) | AOCS Celc-89 | 0.2 |
| C17-1 (10-Heptadecanoic Acid) | AOCS Celc-89 | |
| C18 (Stearic Acid) | AOCS Celc-89 | 48.1 |
| C18-1 (Oleic Acid) | AOCS Celc-89 | 32.6 |
| C18-2 (Lenoleic Acid) | AOCS Celc-89 | 7.5 |
| C18-3 (Linolenic Acid) | AOCS Celc-89 | 0.2 |
| C20 (Arachidic Acid) | AOCS Celc-89 | 0.4 |
| C20-1 (Eicosenoic Acid) | AOCS Celc-89 | |
| C22 (Behenic Acid) | AOCS Celc-89 | 0.3 |
| C22-1 (Erucic Acid) | AOCS Celc-89 | |
| C24 (Liqnoceric Acid) | AOCS Celc-89 | |
| Other | AOCS Celc-89 | |
| Trans Fat | | |
| C18-1 Trans | AOCS Celc-89 | 12.6 |
| C18-2 Trans | AOCS Celc-89 | 3.2 |
| C18-3 Trans | AOCS Celc-89 | |
| Total Trans Fat | AOCS Celc-89 | 15.8 |
| Iodine Value | AOCS Cdlb-87 | 41.5 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent they provide exemplary, procedural or other details supplementary to those set forth herein.

What is claimed is:

1. A hydrogenation system comprising:
   at least one high shear device comprising:
   at least one inlet for a stream comprising unsaturated liquid fat or oil and at least one inlet for a stream comprising hydrogen gas;
   at least one toothed rotor/stator pair separated by a clearance; and
   an outlet for a dispersion comprising hydrogen gas bubbles having an average bubble size of less than about 5 μm; and
   at least one vessel downstream of the at least one high shear device.

2. The system of claim 1 wherein the average bubble size is less than about 0.4 μm.

3. The system of claim 1 wherein the minimum clearance between the stator and the rotor is in the range of from about 0.001 inch to about 0.125 inch.

4. The system of claim 3 wherein the minimum clearance between the stator and rotor is about 0.060 inch.

5. The system of claim 3 wherein the high shear device produces a tip speed of at least 1000 ft/min.

6. The system of claim 1 wherein the high shear device comprises a colloid mill.

7. The system of claim 6 wherein the colloid mill comprises a multiple stage inline disperser.

8. The system of claim 7 wherein the shear force varies with longitudinal position along the flow pathway.

9. The system of claim 1 wherein the vessel downstream of the at least one high shear device, further comprises an inlet fluidly connected with the dispersion outlet of the high shear device and wherein the vessel is configured as a fixed or fluidized bed catalyst reactor.

10. The system of claim 9 wherein the vessel further comprises an outlet for a recycle stream, the outlet for the recycle stream being fluidly connected with the inlet for a stream comprising unsaturated liquid fat or oil.

11. The system of claim 10 further comprising a pump configured to increase the pressure of the recycle stream prior to introduction of the recycle stream into the at least one high shear device.

12. The system of claim 1 comprising at least two high shear devices.

13. The system of claim 12 wherein the at least two high shear devices are connected in series.

14. A method of hydrogenating fat or oil, the method comprising:
   subjecting hydrogen and the fat or oil to high shear in at least one high shear device,
   wherein the at least one high shear device comprises:
   at least one inlet for a stream comprising unsaturated fat or oil and at least one inlet for a stream comprising hydrogen gas;
   at least one toothed rotor/stator pair; and
   an outlet for a dispersion; and
   forming a dispersion in the high shear device whereby hydrogen reacts with unsaturated fat or oil to saturate at least a portion of the unsaturated fat or oil, whereby the dispersion comprises hydrogen bubbles having an average bubble size of less than about 5 μm.

15. The method of claim 14 wherein the bubble diameter is less than about 0.4 μm.

16. The method of claim 14, further comprising contacting the dispersion with a hydrogenation catalyst.

17. The method of claims 16, wherein the catalyst comprises iron, ruthenium, osmium, cobalt, rhodium, iridium, nickel, palladium and platinum or combinations thereof.

18. The method of claim 16 wherein hydrogen reacts with unsaturated fat or oil to saturate at least a portion of the unsaturated fat or oil at a reaction temperature of less than about 100° C.

19. The method of claim 18 wherein hydrogen reacts with unsaturated fat or oil to saturate at least a portion of the unsaturated fat or oil at a reaction temperature of less than about 70° C.

20. The method of claim 19 wherein hydrogen reacts with unsaturated fat or oil to saturate at least a portion of the unsaturated fat or oil at a reaction temperature of less than about 35° C.

21. The method of claim 16, wherein contacting the dispersion with a hydrogenation catalyst to form at least a partially hydrogenated product comprises introducing the dispersion to a fixed bed reactor containing the catalyst.

22. The method of claim 16 wherein the stream comprising unsaturated fat or oil comprises unsaturated hydrocarbons.

23. The method of claim 16 wherein the stream comprising fat or oil comprises triglycerides and/or unsaturated fatty acids and the method further comprises hydrogenation catalyst.

24. The method of claim 23 further comprising mixing the catalyst with the stream comprising triglycerides and/or unsaturated fatty acids to form a slurry prior to introducing the hydrogen gas into the stream comprising triglycerides or unsaturated fatty acids.

25. The method of claim 24 wherein mixing the catalyst with the stream comprising triglycerides and/or unsaturated fatty acids to form a slurry comprises contacting the catalyst and liquid stream in a reactor,
   wherein the reactor comprises: a recycle outlet fluidly connected to the inlet for the stream comprising fat or oil of the at least one high shear device; an outlet for gas; and an inlet for dispersion; and
   wherein the method further comprises introducing slurry from the reactor to the at least one high shear device via the recycle outlet, and introducing dispersion from the at least one high shear device into the reactor via the inlet for dispersion.

26. The method of claim 25 wherein the reactor is at atmospheric pressure.

27. The method of claim 25 further comprising continuously injecting hydrogen into the slurry exiting reactor and circulating slurry throughout the system until a desired saturation has been attained.

28. The method of claim 23 wherein the unsaturated fatty acids are selected from the group consisting of myristoleic acid, palmitoleic acid, oleic acid, linoleic acid, alpha-linolenic acid, arachidonic acid, eicosapentaenoic acid, erucic acid, docosahexaenoic acid, and combinations thereof.

29. The method of claim 23 wherein the triglyceride stream is selected from the group consisting of vegetable oil, rapeseed oil, animal fats, corn oil, canola oil, olive oil, cottonseed oil, safflower oil, palm oil, soya oil, sunflower oil, peanut oil, coconut oil, and combinations thereof.

30. The method of claim 23 wherein the iodine value of the triglycerides and/or unsaturated fatty acids is decreased by at least 10%.

31. The method of claim 23 wherein the stream comprising triglycerides and/or unsaturated fatty acids further comprises an organic solvent.

32. The method of claim 31 wherein the organic solvent comprises hexane.

33. The method of claim 28 further comprising activating the catalyst by heating an activation vessel comprising the catalyst and introducing an activation gas to the catalyst at a pressure greater than atmospheric pressure.

34. The method of claim 33 wherein the activation gas further comprises a gas selected from the groups consisting of hydrogen, $CO_2$, He, nitrogen, and combinations thereof.

35. The method of claim 33 wherein activating the catalyst further comprises purging gas from the activation vessel during activation.

* * * * *